United States Patent
Kumar et al.

[11] Patent Number: 5,926,239
[45] Date of Patent: Jul. 20, 1999

[54] BACKLIGHTS FOR COLOR LIQUID CRYSTAL DISPLAYS

[75] Inventors: Nalin Kumar, Austin, Tex.; Zvi Yaniv, Bloomfield Hills, Mich.

[73] Assignee: SI Diamond Technology, Inc., Austin, Tex.

[21] Appl. No.: 08/755,168

[22] Filed: Nov. 22, 1996

Related U.S. Application Data

[63] Continuation-in-part of application No. 08/699,119, Aug. 16, 1996.

[51] Int. Cl.$^6$ .................................................. G02F 1/1335
[52] U.S. Cl. ................................................. 349/69; 349/71
[58] Field of Search .................................. 349/62, 69, 70, 349/71, 95, 96, 112, 158, 159; 345/5, 74, 75, 76, 88; 313/111, 112, 503, 505, 509

[56] References Cited

U.S. PATENT DOCUMENTS

| | | | |
|---|---|---|---|
| 4,678,285 | 7/1987 | Ohta et al. ............................. | 350/345 |
| 4,772,885 | 9/1988 | Uehara et al. .......................... | 349/71 |
| 5,103,133 | 4/1992 | Misono ................................... | 313/491 |
| 5,267,062 | 11/1993 | Bottorf .................................... | 359/40 |
| 5,402,143 | 3/1995 | Ge et al. ................................ | 345/102 |
| 5,504,597 | 4/1996 | Sprague et al. ........................ | 359/40 |
| 5,531,880 | 7/1996 | Xie et al. ............................... | 204/478 |
| 5,666,174 | 9/1997 | Cupolo, III . | |

*Primary Examiner*—William L. Sikes
*Assistant Examiner*—Tai V. Duong
*Attorney, Agent, or Firm*—Kelly K. Kordzik; Winstead Sechrest & Minick P.C.

[57] ABSTRACT

A backlight for a color liquid crystal display uses various techniques for activating colored phosphors, which emit colored light to each one of several sub-pixels within a particular liquid crystal display pixel. Activation of the colored phosphors may be performed using field emission devices, both diode and triode, a fluorescent lamp, thin film electroluminescent light, an ultraviolet lamp, a thermionic emitter, or a high-intensity glow discharge lamp. LCD panels are manufactured using less than four glass substrates.

2 Claims, 21 Drawing Sheets

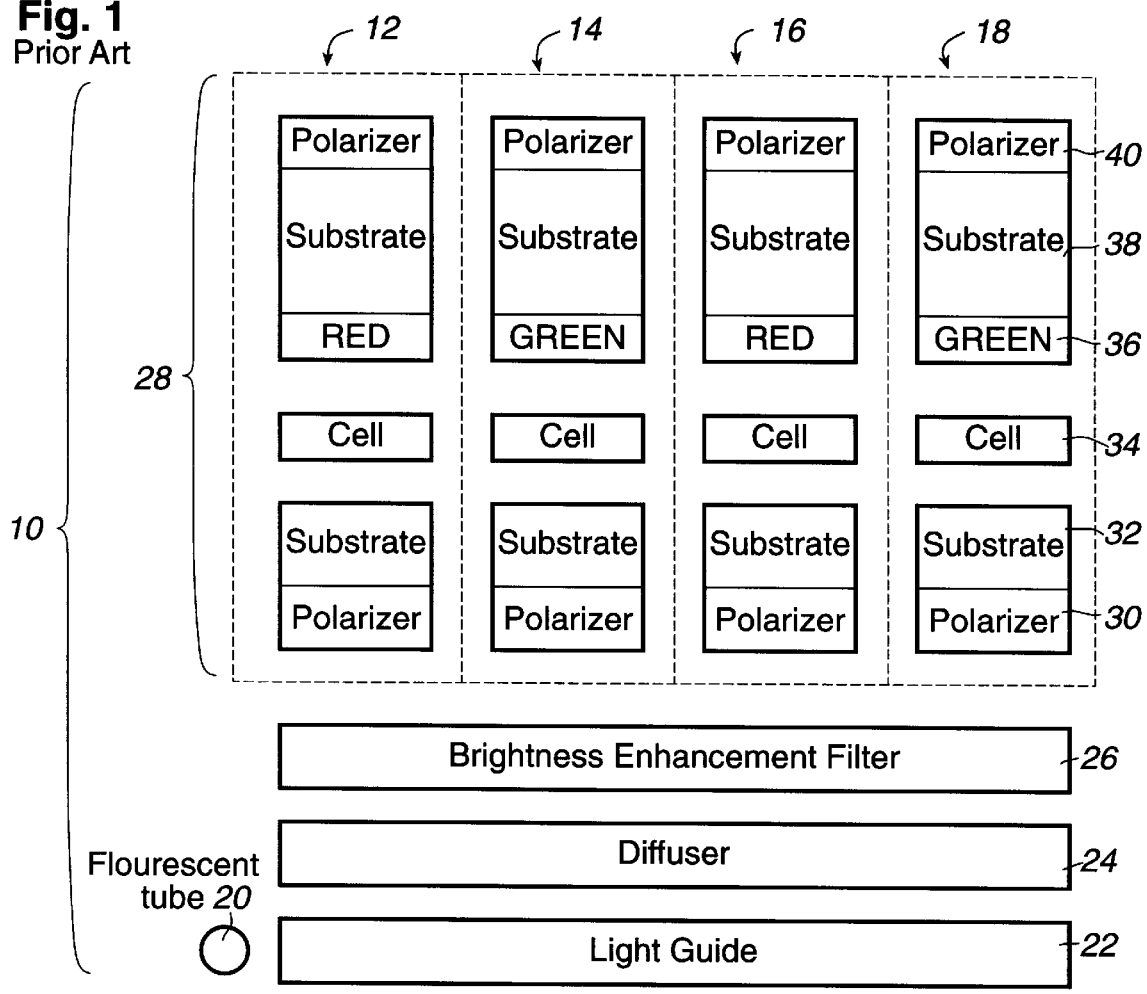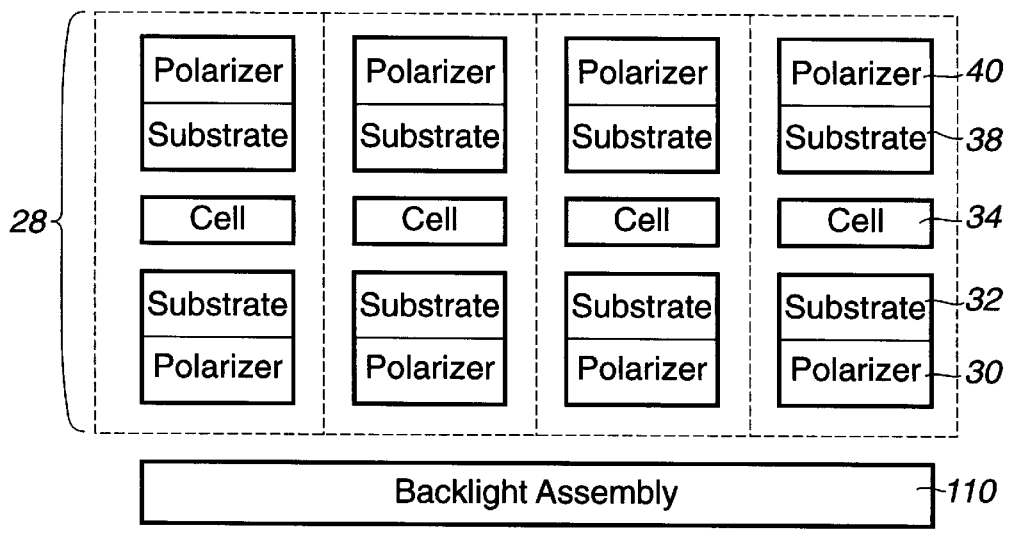

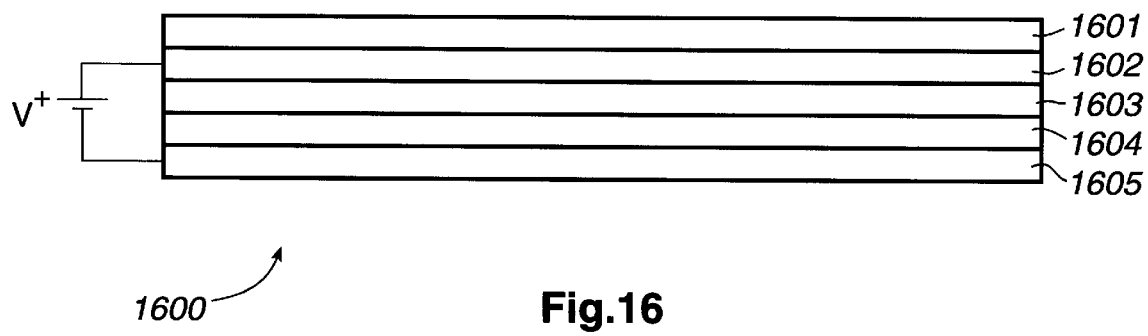
Fig.16
Fig. 17
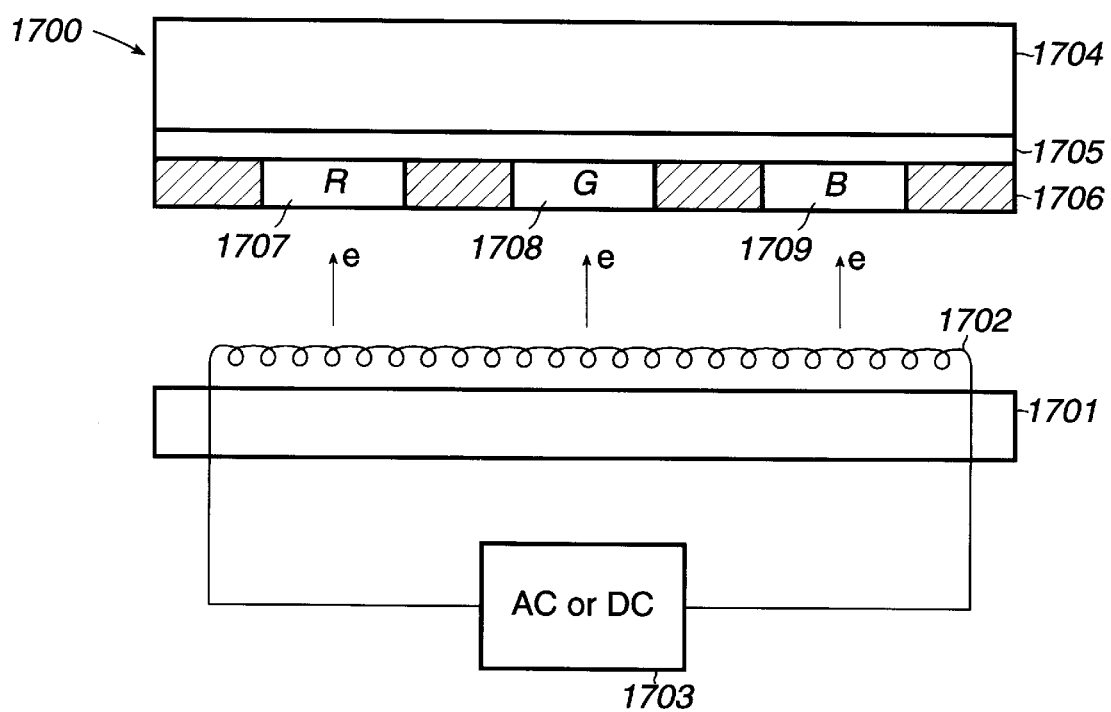

ion implant
of dopant

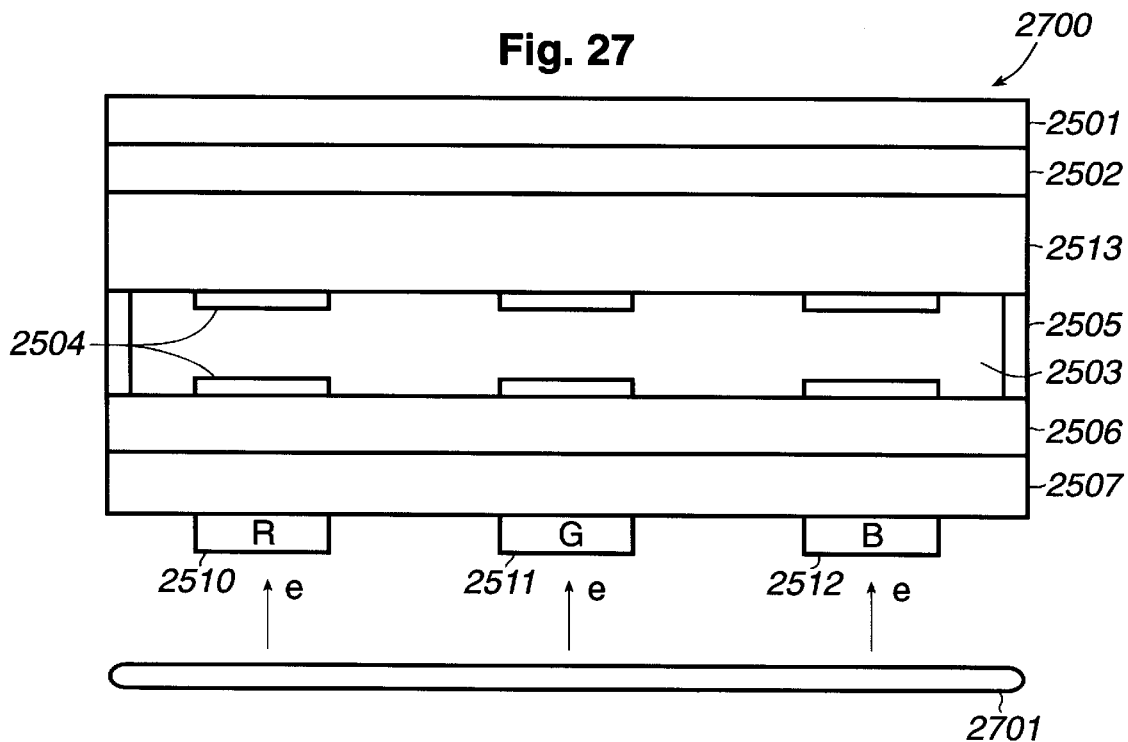
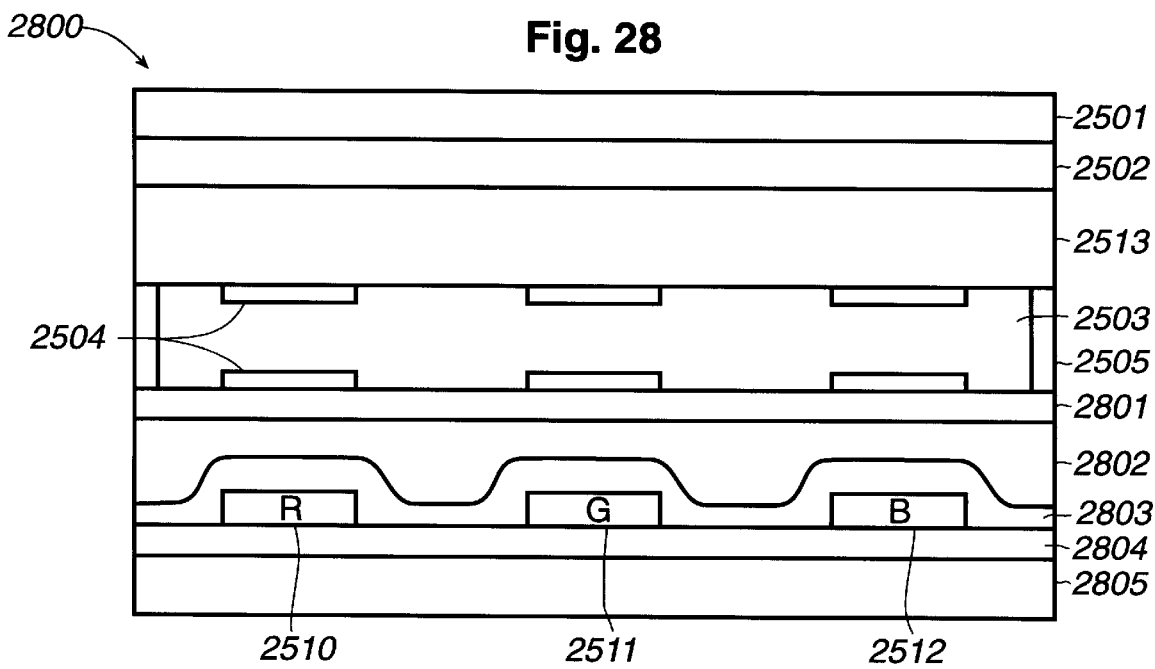

BACKLIGHTS FOR COLOR LIQUID CRYSTAL DISPLAYS

RELATED APPLICATION

This application is a continuation-in-part of co-pending patent application Ser. No. 08/699,119 filed on Aug. 16, 1996, and entitled "Backlights for Color Liquid Crystal Displays," which is hereby incorporated by reference herein.

TECHNICAL FIELD

The present invention relates generally to backlights for use with color liquid crystal displays and specifically to a backlight.

BACKGROUND INFORMATION

Due to their non-emissive nature, traditional liquid crystal Flat Panel Displays ("FPD") use either reflected light or backlights (e.g. cold cathode or hot cathode fluorescent tubes) as white light sources. When a backlight is employed, the white light generated by the backlight is directed to a matrix consisting of individual liquid crystal pixels. Light entering each individual pixel of the matrix is either blocked or transmitted, depending on whether or not a sufficient electric field has been applied to that individual pixel.

In an active matrix type liquid crystal display ("LCD"), each liquid crystal pixel is directly addressable (i.e. able to be directly switched between the "on" and "off" modes by the application of an electric field). Such addressing is typically accomplished with the aid of thin film transistors ("TFT"). In color active matrix LCDs, as well as in passive matrix color LCDs, individual liquid crystal pixels are grouped into formations of several sub-pixels. Within the formation, each individual sub-pixel is associated with a color filter (e.g., in a three sub-pixel formation, each sub-pixel would be associated with either a red, green or blue filter). Typical formations include three or four sub-pixels arranged in a vertical stripe, quad, triad or horizontal stripe configuration, although other configurations and filter colors are possible.

Details regarding conventional LCD configurations, conventional backlights, and the operation of conventional liquid crystal displays are well known in the art. See, for example, S. W. Depp and W. E. Howard "Flat Panel Displays" Scientific American, page 90, (March, 1993); H. Miller, "An Examination of Active Matrix Technologies and Components", Sharp LCD Application Note, pages 2–10–2–14; and A. Dragon, "Backlighting," Sharp Application Notes, pages 2–100–2–106.

FIG. 1 illustrates a simplified cross sectional representation of a generic conventional backlit color LCD 10 having liquid crystal sub-pixels 12, 14, 16, and 18, i.e. two red sub-pixels, 12 and 16, and two green sub-pixels, 14 and 18. The white light source, used as a backlight in the LCD configuration of FIG. 1, is a conventional cold cathode fluorescent tube 20. Associated with this light source are light guide 22, diffuser 24 and brightness enhancement filter 26. The entire arrangement, 28, of all liquid crystal pixels and sub-pixels, is known as a liquid crystal matrix. (The liquid crystal matrix of a typical LCD can contain on the order of several hundred thousand pixels and several times more sub-pixels. For clarity, only four sub-pixels are shown in FIG. 1). Each liquid crystal sub-pixel (12, 14, 16 and 18) has a first polarizer 30 on first glass substrate 32, a TFT driven liquid crystal cell 34, a color filter 36, second glass substrate 38 and second polarizer 40. In sub-pixels 12 and 16, color filter 36 is a red filter and in pixels 14 and 18 a green filter.

During operation of the generic LCD 10 of FIG. 1, white light leaving brightness enhancement filter 26 travels to the each of the individual liquid crystal sub-pixels 12, 14, 16 and 18. Depending upon the magnitude of an electric field applied to each liquid crystal sub-pixel (by means not shown), the white light incident on first polarizer 30 is either (i) transmitted through the entire liquid crystal sub-pixel, including color filter 36 and second polarizer 40, and therefore exits polarizer 40 as colored light or (ii) blocked by operation of the liquid crystal sub-pixel. In order to block the incident light, the polarization of the light which exits first polarizer 30, through first glass substrate 32, is rotated by liquid crystal molecules (not shown) contained in liquid crystal cell 34 such that the colored light leaving color filter 36 is blocked by second polarizer 40.

A major disadvantage of a conventional backlit color LCD is that a majority of the light generated by the white light source is lost due to the less than ideal transparency associated with each of the liquid crystal display components. For example, color filters employed in LCDs typically have a light transmission efficiency (defined as the percentage of incident light that is transmitted through the filter) of between 20 and 33%. See, P. Pleshko, "Overview and Status of Information Displays" Society for Information Display, 1992 Seminar Lecture Notes, May 18. Therefore, if a red-filtered sub-pixel is in the "on" (light transmitting) mode, at least 66% of the white light incident on the red-filtered liquid crystal sub-pixel (i.e. the non-red wavelength portions of the white light) is blocked by the filter and therefore wasted. Likewise, the green and blue-filtered liquid crystal sub-pixels, even when transmitting light, waste at least 66% of the incident white light. Moreover, as illustrated by the typical values in Table 1, the overall efficiency of the light transmission, taking into account the efficiency of each of the liquid crystal display components, is typically only around 3–4% (see, Pleshko, supra at page M-0/63).

TABLE 1

Conventional Backlit Color LCD

| Component | Transmissivity | Cumulative Transmissivity |
|---|---|---|
| Backlight Components | 0.56 | 0.56 |
| Polarizer | 0.8 | 0.4 |
| Substrate | 0.945 | 0.37 |
| Color Filters | 0.2 | 0.075 |
| Liquid Crystal | 0.65 | 0.049 |
| Substrate | 0.945 | 0.0464 |
| Polarizer | 0.80 | 0.037 |
| Total | | 0.037 |

Other disadvantages associated with conventional backlit Liquid crystal displays are the relatively high cost of the color filters and an inability to generate a high intensity image at a relatively low power input (typically measured in units of lumens per watt).

One proposed alternative to conventional cold cathode or hot cathode fluorescent tubes backlights is a cathodoluminescent lamp employing thin film edge emitting devices as electron sources. See Akinwande, et al., "Thin Film Edge Emitter Vacuum Microelectronics Devices for Lamp/Backlight Applications," Eighth International Vacuum Microelectronics Conference Technical Digest, Jul. 30–Aug. 3, 1995, page 418. This configuration, however, still requires color filters, with their attendant inefficiencies, to produce a multi-color image.

As a result of the foregoing, what is still needed in the art is a cost effective, low power, multi-color liquid crystal display with a high light transmission efficiency and brightness.

SUMMARY OF THE INVENTION

The foregoing need is satisfied by the present invention, which is a color backlight for use with liquid crystal displays including (i) a light emitting faceplate patterned with colored-light-emitting phosphor pixels having a predetermined size, pattern and spacing, so as to cooperate with corresponding liquid crystal sub-pixels of a liquid crystal matrix, and (ii) a broad area source of electrons adapted to provide electrons to the phosphor pixels.

In one embodiment, the broad area source of electrons is a cold cathode field emitting device and the phosphor pattern is disposed on the anode of the device. Another embodiment employs either diode-configuration or triode-configuration cold cathode field emitting devices that utilize thin film diamond emitters.

Use of a field emission-based color backlight eliminates the need for expensive color filters in the LCD pixel. The elimination of the color filters increases the efficiency of light transmission by at least a factor of three. In addition, conventional backlights generate white light at a power efficiency of approximately 15 lumens per watt. Multiplying this by an overall transmission efficiency of a conventional color LCD, approximately 4% as reported in Table 1, yields an overall LCD power efficiency of 0.6 lumens per watt. In comparison, a field-emission device employing patterned colored-light-emitting phosphors can typically generate light at an efficiency of approximately 20 lumens per watt. Multiplying this by an overall LCD transmission efficiency of approximately 15–18% (higher than a conventional LCD configuration because conventional light guide, light diffuser components and color filters components are not required) yields an overall LCD power efficiency of approximately 3.3 lumens per watt. See Table 2. This is 5.5 times greater than the conventional LCD configuration. The present invention, therefore, can provide either increased brightness at conventional power consumption levels or an equivalent brightness at a lower power consumption.

TABLE 2

| Component | Transmissivity | Cumulative Transmissivity |
|---|---|---|
| Backlight Components | 0.44 | 0.44 |
| Polarizer | 0.8 | 0.352 |
| Substrate | 0.945 | 0.333 |
| Color Filters | N/A | 0.333 |
| Liquid Crystal | 0.65 | 0.216 |
| Substrate | 0.945 | 0.204 |
| Polarizer | 0.80 | 0.164 |

In one alternative embodiment of the present invention, the backlight for a color LCD utilizes ultraviolet (UV) bombardment of the color phosphors from a plasma produced in the same manner as a fluorescent lamp.

In yet another alternative embodiment of the present invention, bombardment of electrons upon the color phosphors is produced from a glow discharge from a high-intensity lamp.

In yet another alternative embodiment of the present invention, photons emitted from the color phosphors are focused towards the LCD sub-pixels by a focusing lens feature embodied within the anode structure of the backlight.

In yet still another alternative embodiment, a electroluminescent backlight is produced with a thin film phosphor.

In another alternative embodiment, a thermionic emitter, such as a tungsten filament, is used to produce electrons to bombard color phosphors for producing a colored backlight for an LCD.

In an additional alternative embodiment, optical fibers are stacked side-by-side and then fused together and sliced to produce a collimator for providing a guide for light emitted from the colored phosphors of the backlight.

In other alternative embodiments of the present invention, an entire LCD display is produced with fewer than four glass substrates by incorporating one or more of the various technologies described above.

In yet another alternative embodiment, ion implantation of a dopant into a glass substrate is performed to produce a collimator where the doped substrate has a different refractive index for focusing light produced by the colored phosphors.

In yet another alternative embodiment, an ultraviolet lamp is utilized to produce electrons for bombarding the colored phosphors of the backlight.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIG. 1 is a cross-sectional schematic of a generic conventional color LCD employing a fluorescent backlight.

FIG. 2 is a cross-sectional display of a color LCD display employing a color field emission backlight assembly.

FIG. 16 illustrates an electroluminescent backlight.

FIG. 17 illustrates a thermionic emitter within a backlight in accordance with the present invention.

FIG. 27 illustrates an LCD using an ultraviolet lamp.

FIG. 28 illustrates another embodiment of an LCD display using only two glass substrates.

DETAILED DESCRIPTION

Figure 3:
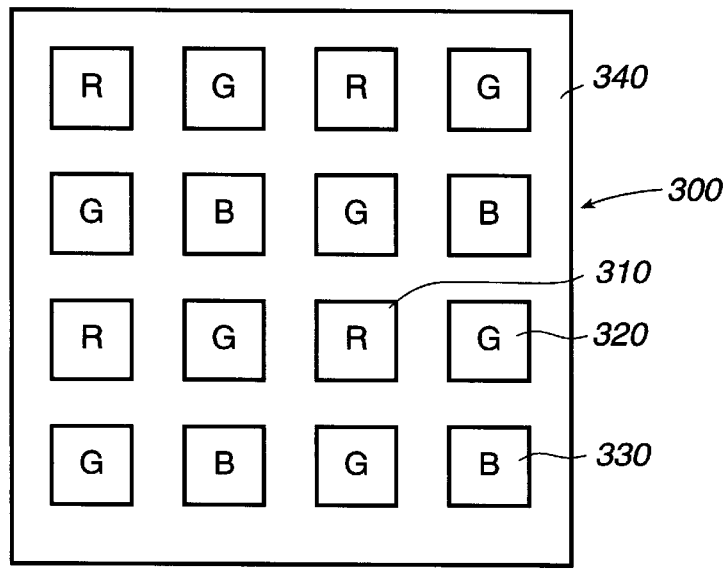
FIGS. 3 is a schematic representations of the pixel-like arrangement of red (R), green (G) and blue (B) phosphors on a faceplate.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

All basic embodiments of the patterned-phosphor color backlight assembly include a faceplate patterned with light-emitting phosphor pixels of differing colors (e.g. a mixture of red, green and blue light-emitting phosphors though other colors may be utilized). The phosphor pixels are of a predetermined size and are arranged in a pattern that corresponds to the liquid crystal pixel arrangement of the liquid crystal matrix with which the backlight will be used. The size of the phosphor pixels may be equal to, larger than, or smaller than the corresponding liquid crystal sub-pixels. Also included in the patterned phosphor color backlight assembly is a broad area source of electrons adapted to uniformly provide electrons to the patterned-phosphor pixels of the faceplate.

FIG. 2 schematically illustrates a portion of an LCD employing such a patterned multi-colored-light-emitting phosphor backlight assembly. In the embodiment of FIG. 2, a multi-colored-light-emitting patterned phosphor backlight assembly 110 has both a broad area electron source and a light-emitting-patterned phosphor faceplate integrated into a unitary assembly. Backlight assembly 110 is positioned in close proximity to standard LCD pixel matrix 28. Each of the LCD matrix pixel components illustrated in FIG. 2 has the same function as that described with respect to FIG. 1. The difference between the configuration of a conventional color LCD shown in FIG. 1 and that of the embodiment shown in FIG. 2, is that light source 20, light guide 22, light diffuser 24, color filters 36, and optionally brightness enhancer 26, of FIG. 1 have been replaced with patterned phosphor color backlight assembly 110.

FIG. 3 schematically represents a light-emitting patterned phosphor faceplate 300 for use in backlight assembly 110. Patterned red phosphor pixels (R) 310, green phosphor pixels (G) 320 and blue phosphor pixels (B) 330 are disposed in a predetermined pattern on the surface of faceplate substrate 340. The pixels of FIG. 3 are arranged in four formations of four pixels each (two green and one each of red and blue), for a total of sixteen pixels. The size, spacing and pattern of the red, green and blue phosphor pixels are predetermined such that each color phosphor pixel provides colored light to essentially a single corresponding liquid crystal sub-pixel of an associated liquid crystal matrix. The phosphor pixel of FIG. 3 is arranged in a quad formation and may be used with a liquid crystal matrix having sub-pixels also arranged in a quad formation.

In one embodiment, there are two green phosphor pixels, one red pixel and one blue pixel in each quad formation, and the size of each four pixel formation is on the order of 330 microns by 330 microns. The size, color, spacing and pattern of the phosphor pixels, as well as the number of pixel formations are, of course, not limited to that of FIG. 3 but can be adapted as needed to correspond to the pixels of an associated liquid crystal matrix 28. The patterned color-phosphors could, for example, be arranged in a vertical stripe, horizontal stripe, linear stripe or other formation.

The light-emitting color phosphor pixels are composed of any suitable phosphor that will emit colored light when subjected to electrons from a broad area electron source. Examples of known phosphors include ZnO:Zn (blue-green), ZnS:Mn, $La_2O_2S$:Tb (green), $Y_2O_2S$:Eu (red), LaO-Br:Tb (blue) and ZnS:Ag (blue). In one embodiment, the phosphors are those used for high-voltage applications, such as in cathode ray tubes. However, the present invention can be practiced using low voltage electrons and phosphors developed for the appropriate voltage applied. See Jacobsen, et al. "Improved Performance of Low Voltage Phosphors for Field Emission Displays" SID Display Manufacturing Conference, Late News, page 1, Santa Clara, Calif., Feb. 2, 1995.

The phosphors can be deposited on the faceplate 340 by electrophoretic deposition of powdered phosphors, application and patterning of photosensitive slurries containing phosphors, and silk screening techniques, all of which are well known in the art. Alternatively, the phosphors may be deposited using a process described within U.S. Pat. No. 5,531,880, which is hereby incorporated by reference herein.

Faceplate 340 will take on one of several various embodiments depending upon the particular electron source utilized within the backlight. Such embodiments are further described below.

The broad area electron source adapted to provide electrons to the patterned phosphor pixels can be of any suitable design, including those well known in the art, as long as it is capable of providing sufficient electrons to the patterned phosphor pixels to cause the emission of a sufficient flux of colored light from the phosphors.

Several embodiments of the broad area electron source include cold cathode field emitting devices, such as flat diamond field emission diode devices, flat diamond field emission triode devices or field emitting microtip devices. Details regarding the fabrication and operation of cold cathode field emitting devices and displays are well known in the art. See, for example, N. Kumar et al., "Development of Nano-Crystalline Diamond-Based Field-Emission Displays" SID Digest of Technical papers Vol. 25 page 43 (1994); Kumar et al, "Field Emission Displays Based on Diamond Thin Films", Society of Information Display Conference, Technical Digest, 1993, pp. 1009–1010; Xie et al, "Electron Field Emission from Amorphic Diamond Thin Films", 6th International Vacuum Microelectronics Conference Technical Digest, 1993, pp. 162–163; and xie et al. "Use of Diamond Thin Films for Low Cost Field Emission Displays", 7th International Vacuum Microelectronics Conference Technical Digest, 1994, pp. 229–232; and U.S. Pat. Nos. 5,199,918, 5,312,514, 5,341,063, 5,399,238, 5,449,970, 5,528,099, 5,548,185, 5,536,193, 5,543,684, and 5,252,833, each of which is hereby incorporated by reference herein.

Figure 4:
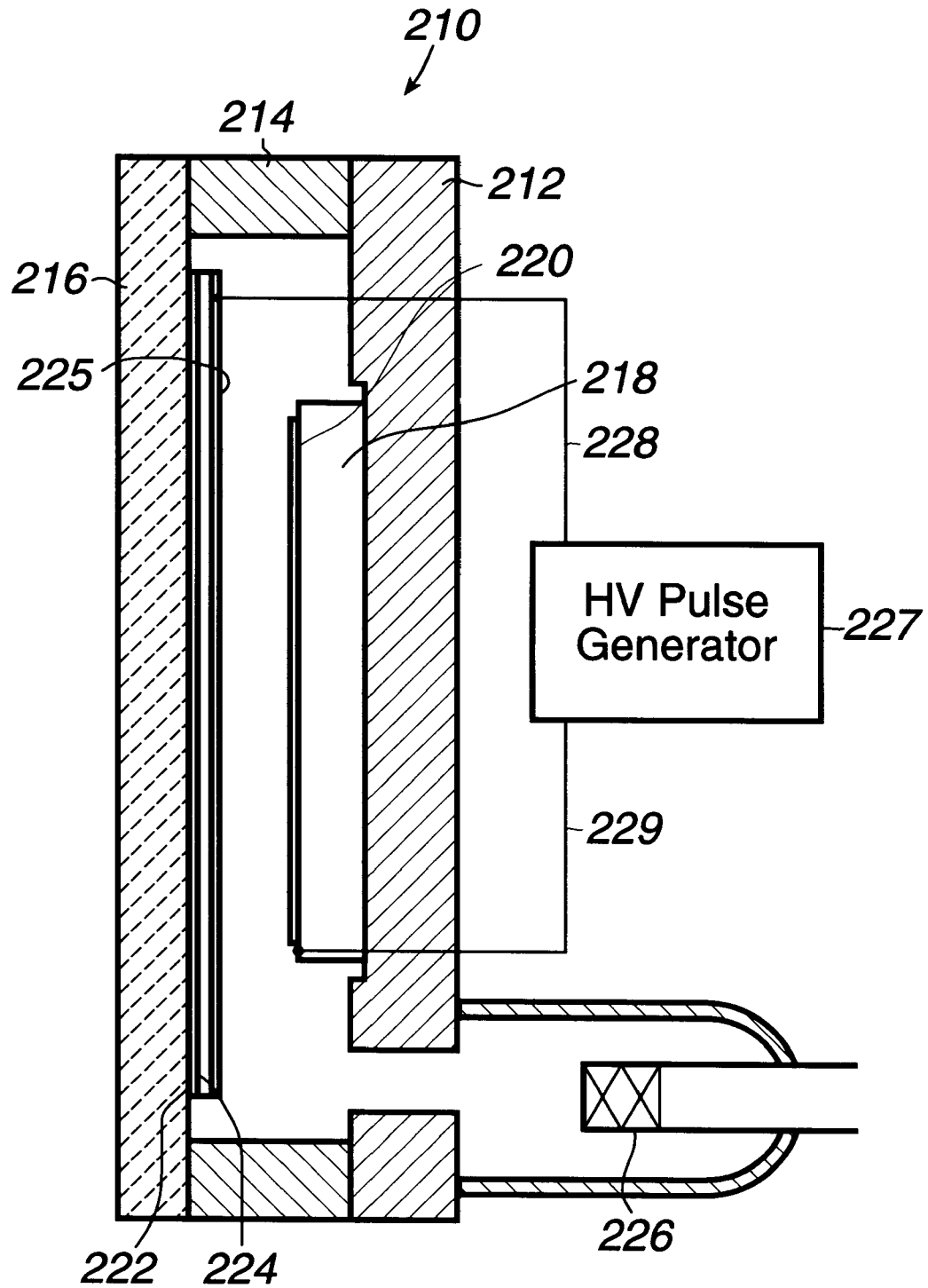
FIG. 4 is a schematic drawing of one embodiment of the electrodes and associated electronics of the invention.

A light source or lamp and method of causing light emission from the phosphors of this invention is described in co-pending application titled "Pulsed Cathodoluminescent Lamp," filed Mar. 25, 1996 (Ser. No. 08/621,531) assigned to a common assignee. Referring to FIG. 4, cathode 220 has a cold-electron-emitting surface with low effective field emission work function. A low effective field emission work function material is defined as any material having a threshold electric field for electron emission of less than 50 Volts/micrometer. The emitting surface may be prepared by first growing on substrate 218 a metal layer. Any metal normally used in the semiconductor industry, such as molybdenum, tungsten, chromium, copper or aluminum, may be used. Preferably, a carbonaceous layer having low effective field emission work function is then deposited on the metal layer. If substrate 218 is sufficiently electrically conductive, the metal layer is not required. The carbonaceous coating may be a coating deposited by the laser ablation process described in U.S. Pat. No. 4,987,007, entitled "Amorphic Diamond Material Produced by Laser Plasma Deposition," incorporated by reference herein, or may be applied by a variety of chemical vapor deposition (CVD) processes, or by any other process which produces a low effective field emission work function surface. The cathode layer 220 is selected to have high current output at low electrical field gradient and to have uniformity in emission over the surface with high emission-site density.

Assembly 210 also includes spacers 214, anode (glass) substrate 216, ITO (indium tin oxide) layer 222, and phosphor 224. Optionally, aluminum (Al) layer 225 of 100 angstroms to 5,000 angstroms may be deposited on phosphor 224, which will allow electrons from cathode 220 to pass to phosphor 224, but which will reflect photons up to the anode.

After the cathode and anode materials are in place, lamp assembly 210 is evacuated to a high vacuum and sealed. Getter 226 may then be activated to remove remaining gases from inside assembly 210. The pressure in assembly 210 may be reduced to less than $10^{-5}$ torr. The high vacuum is to avoid positive ions forming in the gas and bombarding and destroying the cathode. Electrical leads 228 and 229 connect the anode and cathode respectively to the pulse generator 227.

Operation of lamp assembly 210 includes driving the diode assembly with high voltage pulses. The reason for driving the assembly with electrical pulses will be explained below. In operation, assembly 210 is connected to a high voltage, usually a pulse generator 227, which is adjusted to produce either positive or negative pulses having the desired voltage, frequency and pulse length (duty cycle) to produce light output at the desired level. Duty cycle of the pulses, defined as time-on divided by cycle time, may be less than 5 per cent and may be less than 1 per cent. It is possible, however, to operate the lamp with DC voltage (100 per cent duty cycle), but the lamp may suffer from problems as described in the following sections, particularly if the lamp is on for a significant time.

Voltage applied between the cathode and anode is in the range of 6 kilovolts to 30 kilovolts. In one embodiment, voltage is in the range of 10 kilovolts to 12 kilovolts. The gap distance between cathode and anode is preferably in the range of 0.1 mm to 10 mm, but gap distance will be selected based on emission characteristics of the cathode and other factors as described below . Electric field in the gap will normally be in the range from about 1 volt per micrometer to about 50 volts per micrometer.

The reason for application of high voltage pulses having a low duty cycle can best be understood by examination of curves showing current output versus electrical field and emission site density (ESD) of a diamond cold cathode as a function of electrical field gradient at the cathode. Such curves are provided in FIG. 5. The data represented in these curves are obtained by the following procedure: a flat cathode is placed in a vacuum cell and at a selected distance from a transparent anode. A DC voltage is applied and current through the gap is measured as a function of voltage. While voltage is applied, a magnified view of the anode is obtained, either by placing a microscope so as to directly observe the anode or by taking a high-resolution photograph of the anode. The number of points of light on the anode is then measured over the viewing area and the average density of light emission sites is calculated.

Figure 5:
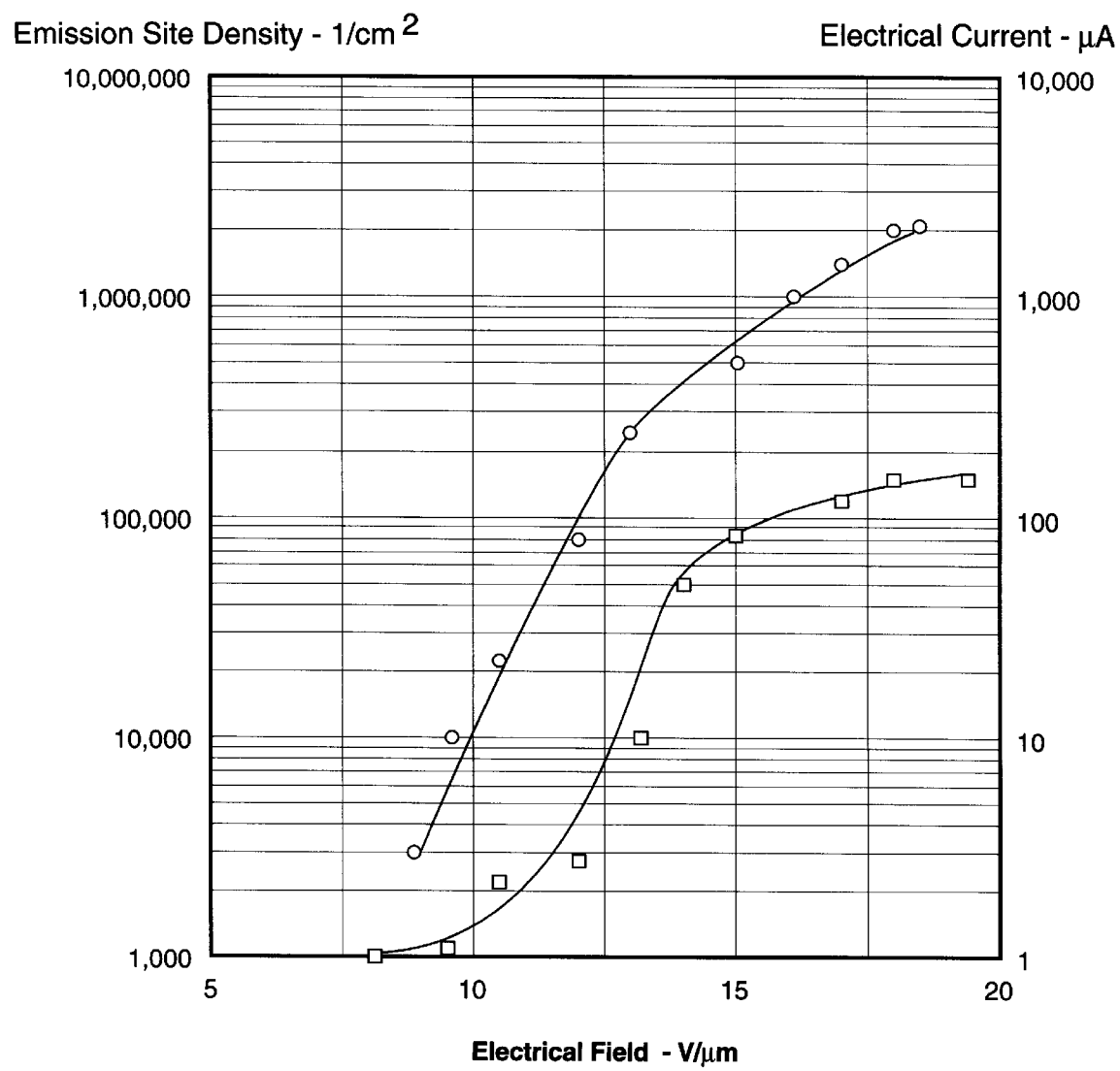
FIG. 5 is a graph of emission site density and electrical current vs. electrical field strength for a cathode of the light source of one embodiment of the invention.

The data shown in FIG. 5 were obtained with a gap distance of 21 micrometers, an area of the cathode of 0.0035 $cm^2$, pulse width of 20 microseconds, pulse frequency of 60 Hz and an area of current collection of 6.35 $mm^2$.

The design of a lamp according to the present invention begins with a selection of the light output desired. For example, assume that an output of 10,000 Ft-Lamberts of light is desired and that the efficiency of the phosphors that will be used is 20 Lumen per watt. The output of light is then about 11 Lumen per $cm^2$. Assume that a voltage of 10 kilovolts will be used. The electrical power input required is then 11 Lumen per $cm^2$ divided by 20 Lumen per watt, which is approximately 0.5 watt per $cm^2$. To produce this electrical power, the average electrical current density will be 0.5 watt per cm$^2$ divided by 10 kilovolts, or 50 microamps per cm$^2$. If one observes a graph of Emission Site Density (ESD, expressed in sites per cm$^2$) vs. electrical current for a low effective field emission work function cold cathode made of carbonaceous material, one sees that ESD is very low at such low current density. For a lamp, a high ESD is desired. For example, using data from a cathode discussed further below, if an ESD of 10,000 sites per cm$^2$ is desired, the current will be in the range of 10 millamps per cm$^2$. To bring the electrical power in line with requirements of 50 microamps per cm$^2$ and at the same time produce the high ESD for a lamp, the duty cycle of the electrical pulses driving the lamp will be 50 microamps divided by 10 milliamps, or 0.5 per cent. For a frequency of pulses of 1 kHz, the pulse width would then be 5 microseconds.

From a graph of ESD vs. electrical field for the cathode material to be used, the electrical field to produce the desired ESD can be determined. At this electrical field, for the voltage of the pulses, the gap spacing between the cathode and anode can be determined.

Examination of the curves shows that driving the diode having the cold cathode at low electrical field strength produces only low emission site density. This results in low light output from a device using such cathode. Experiments have shown that at low site density "hot spots" are present on the cathode. This produces burning of the cathode and burning of the phosphor opposite the hot spot in the diode configuration. The solution to the problem of low site density or hot spots has been found to be the use of high-voltage pulses. Reference to FIG. 5 shows that at high electric fields, the emission site density becomes orders of magnitude greater. For example, at an electrical field of 12 volts per micrometer the emission site density was about 2800 sites per cm$^2$. At a field of 15 volts per micrometer, the emission site density had increased to about 85,000 sites per cm$^2$ However, emission current had also become much larger—increasing from about 60 microamperes to about 500 microamperes. Power consumption of the diode under DC operation per cm$^2$ of area would be [500×10$^{-6}$×10 kV×1/0.0035] 1.4 kilowatts, which would cause severe overheating at the electrodes in a short time and require too much power. It has been found, however, that the application of high voltage pulses at low duty cycle overcomes both the problem of low emission site density and excess power consumption at the electrodes. Neglecting capacitance losses, for example, with a duty cycle of 1%, the power requirement will be in the range of 14 watts.

Voltage of pulses and duty cycle are selected to produce the brightness desired from phosphor layer 24 of FIG. 4, keeping in mind the limitation of heating of the electrodes. A duty cycle of one percent or less can produce a bright lamp using presently available phosphors having normal efficiency. The frequency of the pulses may be in the range from about 20 Hz to about 20 MHz but is selected to produce a light output that is effective for the use intended. Excess flicker or variation in intensity can easily be avoided by increasing frequency of pulses. In one embodiment, pulse frequency is from about 1 kHz to about 10 kHz.

The gap distance between cathode and anode is selected based on emission characteristics of the cathode material. For the material having the properties shown in FIG. 5, a field gradient of at least about 10 volts per micrometer may be needed to reach an acceptable operating range. This would result in a required gap distance of 1 mm when using a pulse of 10 kV. Higher electrical current would be drawn from the cathode than the level at 10 volts per micrometer shown in FIG. 5. If a current corresponding to a field of 15 volts per micrometer were desired, for example, gap distance could be decreased to 0.66 mm for the material having properties shown in FIG. 5. Gap distance may be varied so as to allow operation of the diode in the desired emission site density range and current range for each cathode material selected, keeping in mind the upper voltage limitation to avoid x-ray production if such rays could cause problems in operation of the lamp.

Figure 6:
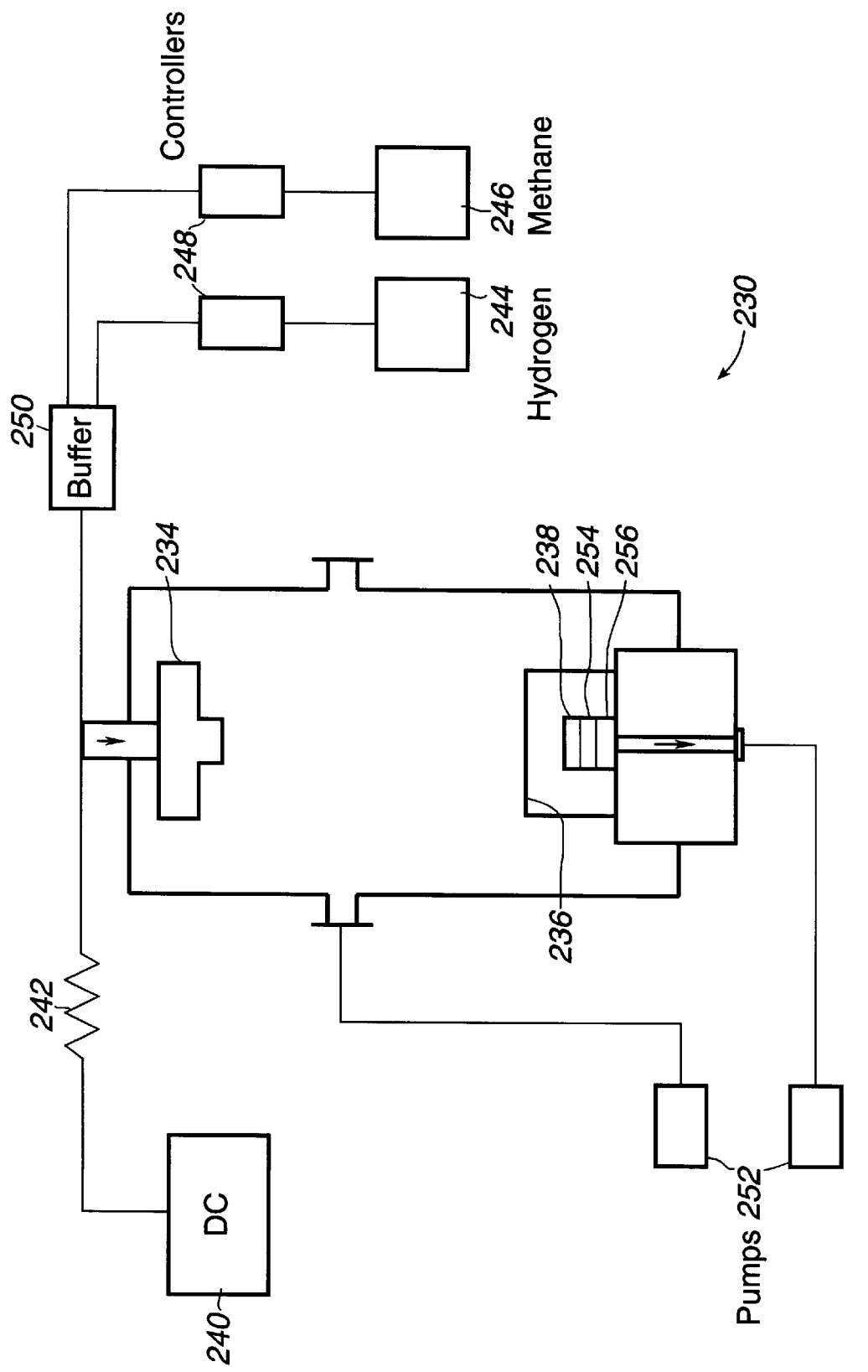
FIG. 6 is a schematic drawing of apparatus used to form a cathode for use in the invention.

The cathode material, having current and emission site properties shown in FIG. 5, was prepared by an apparatus shown in FIG. 6. First, a metal layer may be grown on a substrate wafer, using magnetron sputtering, if the wafer is not sufficiently conductive. (If it is made of glass, for example.) The wafer may then be placed in deposition system 230. Reactor 232, made of stainless steel, encloses cathode 234, anode grid 236 and substrate 238. Cathode 234 may be mounted on a copper holder adapted for the circulation of cooling water. DC power supply 240 provides electrical power through resistor 242. Gases such as hydrogen and methane are supplied from containers 244 and 246 through electronic flow controllers 248 and buffer volume 250. A variety of gases may be used, including ethyl alcohol and other carbon-containing gases which are known to produce CVD diamond. Vacuum pumps 252 maintain a pressure of about 100 to about 300 torr when the gas flow rate is maintained in the range of about 500 standard cm$^3$ per minute (sccm) through reactor 232.

Substrate 238 is placed on substrate holder 254, which may also be a second anode 256, which is usually grounded. Substrate holder 254 may be electrically isolated from the second anode 256, so that substrate 238 is insulated from second anode 256, or both may be grounded. Substrate holder 254 also includes a heating element (not shown) to heat substrate 238, normally to a temperature in the range from 700° C. to about 1100° C. A preferred operating temperature is about 900° C. The surface of substrate holder 254 includes small openings connected to one of vacuum pumps 252 which hold substrate 238 in place by suction force. Water cooling is provided by flow in the center of substrate holder 254.

Substrate 238 may be seeded by a standard procedure well known in the art and is then placed underneath grid 236 to position the substrate 238 "downstream" or out of the discharge region which will exist between cathode 234 and grid 236. By placing substrate 238 out of the plasma region, the glow discharge CVD technique can be used to grow diamond thin films on substrate 238 even if the substrate is an electrical insulator, such as glass. The distance between grid 236 and the surface of substrate 238 ranges between 0.1 and about 5 mm.

Grid 236 is formed as a mesh, made from wire having a diameter of about 0.3 mm. The wire material used may be tungsten. The mesh includes a plurality of openings, each opening having a width of about 0.1 mm to about 5 mm and a length in about the same range of dimensions. Grid 236 is heated. Heating is achieved by the discharge current. The grid temperature is increased to above 1100° C. Grid 236 then behaves as a hot element to increase the diamond film growth rate on substrate 238. The high temperature also allows formation of film material having a structure which is effective as a cold cathode electron emitter. The grid temperature may be above 1300° C. for effective cold electron emission and may be increased to as high as about 2500° C.

Cathode 234 may be formed from a metallic plate or from a porous metallic diaphragm. The tip of cathode 234 has Rogovskey's Form, to provide a more homogenous electric field. The distance between cathode 234 and grid 236 is in the range from about 5 to 50 mm. A negative voltage is applied to cathode 234 while grid 236 is grounded. The voltage between grid 236 and cathode 234 is in the range from about 600 volts to about 1200 volts. Ionization occurs in the gaseous column between the cathode 234 and grid 236 to form a discharge.

To form an effective cathode on a silicon substrate, wherein the silicon has conductivity sufficient not to require a metal layer, first, a film of silicon oxide on substrate 238 is etched or removed. This removal step occurs at a substrate temperature of about 900° C. with hydrogen in chamber 232 at a pressure of about 50 to 300 torr. In the second stage, methane is also admitted to chamber 232 to achieve a methane concentration from about 7% to about 12% along with the hydrogen. In this stage, silicon carbide is formed from the substrate surface. The step of forming the silicon carbide increases the adhesion of the diamond thin film to silicon substrate 238. Also, the silicon carbide layer improves electron ejection from the silicon substrate into the diamond films and increases electron emission from the diamond film grown during the third stage. In the third stage, polycrystalline diamond is grown on the surface. In this stage the methane concentration in the mixture is reduced to between about 3% to about 6%. The thickness of the film is increased to about 0.3 to about 2.0 micrometers. Finally, a step of annealing is added, in which only hydrogen is placed in the reactor and temperature is maintained for a period of about 5 to 15 minutes. To achieve greater uniformity in the emission from the surface, the substrate may be moved as the film is grown. The amplitude of movement may be at least as great as the distance between mesh wires of the grid anode being used. The frequency may be from about 1 Hz to about 100 Hz.

Cathodes prepared by the method described herein are then placed in apparatus as described above and tested for their emission properties. Variables may be adjusted to achieve optimum properties for the lamp design selected.

The apparatus of FIG. 4 includes only one cathode surface. The size of this surface is limited by the area of low-effective field emission work function diamond or carbonaceous material that can be produced on a single surface. Production of wafers having low effective field emission work function diamond coatings up to about 10 inches in diameter is presently available for diamond made by laser ablation. For larger areas than available from one wafer, or for forming a cathode in a preferred pattern, a plurality of cathode areas may be used. Patterning of the cathode areas may be achieved using techniques well known in the industry.

Figure 7:
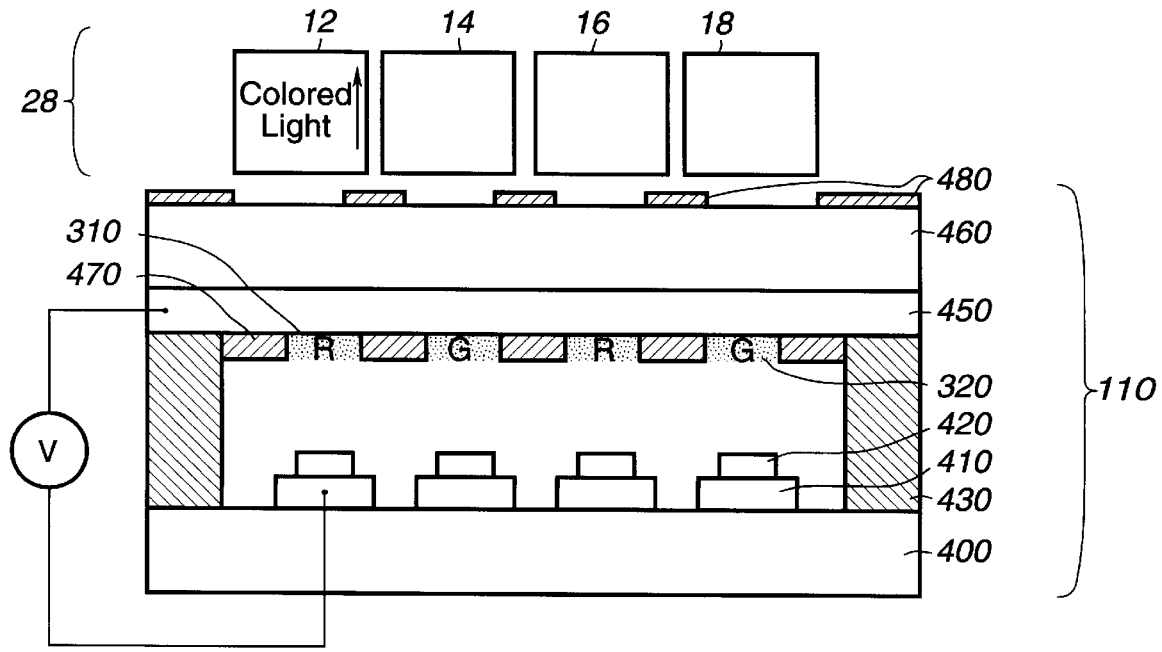
FIG. 7 is a detailed schematic of a flat diode diamond FED backlight assembly.

FIG. 7 is a cross-sectional schematic of one embodiment of a field emission-based color assembly backlight 110. The broad area electron source is a flat diamond field emitting device in a diode configuration. A plurality of diamond film patches 420 is in contact with metal layer 410 on glass cathode 400. Patterned phosphor pixels 310 and 320 (shown as red and green pixels, respectively, although it is understood that the entire assembly would contain numerous pixels of red, green and blue), on indium-tin-oxide film (ITO anode) 450 and glass anode plate 460, are disposed at a predetermined distance above diamond film patches 420. A spacer 430 is provided to maintain the proper distance between the elements. Each phosphor pixel, 310 or 320, is aligned with, and in close proximity to, a standard liquid crystal pixel 28. Each phosphor pixel, 310 or 320, is also aligned with an associated diamond film patch 420 such that when the appropriate electric field is applied across the field emitting diode device, electrons are emitted from the diamond patches and subsequently strike the phosphor pixels, whereupon either red or green light is emitted from the phosphor.

In an alternative embodiment, diamond film patches 420 and metal lines 410 of FIG. 4 are replaced by a continuous sheet-like layers of diamond film and metal respectively.

During operation of the backlight, light emitted from the phosphors travels through transparent ITO film 450 and glass anode 460, and subsequently enters sub-pixels 12, 14, 16 and 18 of liquid crystal pixel 28.

Optionally, a black matrix material 470 may be coated on portions of the exposed ITO film surface not covered by the phosphor pixels 310 and 320. This black matrix coating significantly reduces the likelihood of individual phosphor-pixels emitted light (e.g. a red phosphor pixel) to enter non-corresponding liquid crystal subpixels (e.g. adjacent liquid crystal sub-pixels that correspond with green or blue phosphor pixels). If electrically insulating materials, such as silicon dioxide, are used with the black matrix coating, the coating also reduces loss of power caused by electrons hitting the base ITO film 450. Such black matrix materials are well known in the art of making flat panel displays.

It is also optional to coat a portion of the top surface of the faceplate (i.e. glass anode 460) with black matrix materials 480, leaving openings which correspond with the liquid crystal sub-pixel pattern. These openings further collimate the light coming from a particular phosphor pixel toward its corresponding liquid crystal sub-pixel cell, thereby decreasing stray light entering non-corresponding liquid crystal sub-pixels. The use of black matrix coatings 470 and 480, therefore, improves the color purity of the overall display.

Figure 14:
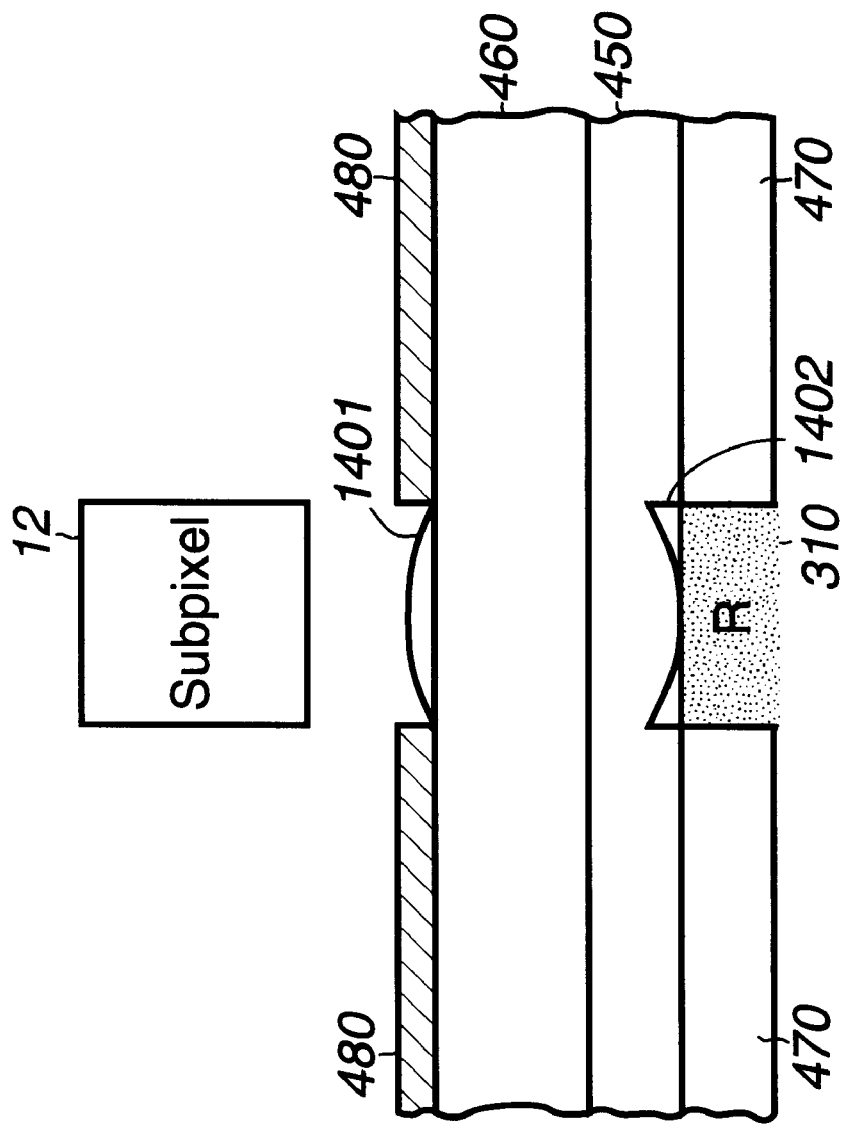
FIG. 14 illustrates focusing of colored light from a phosphor.

Referring to FIG. 14, there is illustrated a further alternative embodiment of the present invention. Illustrated is a portion of the assembly shown in FIG. 7, illustrating one sub-pixel 12 illuminated by photons produced by phosphor 310. Since the light (photons) emitted from phosphor 310 will disburse through ITO 450 and substrate 460 in all directions, focusing lens 1401 and 1402 may be utilized separately or in combination to focus the emitted light onto sub-pixel 12.

Figure 8A:
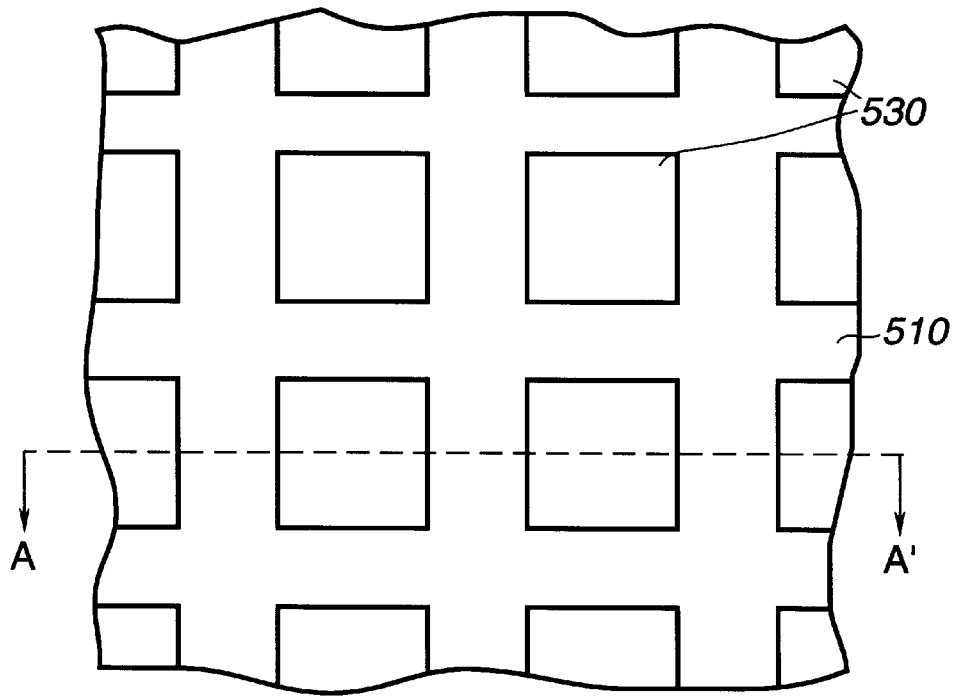
FIG. 8A is a schematic diagram of the surface of a field emitting device's cold cathode plate employing a mesh patterned thin film diamond field emitter.
Figure 8B:
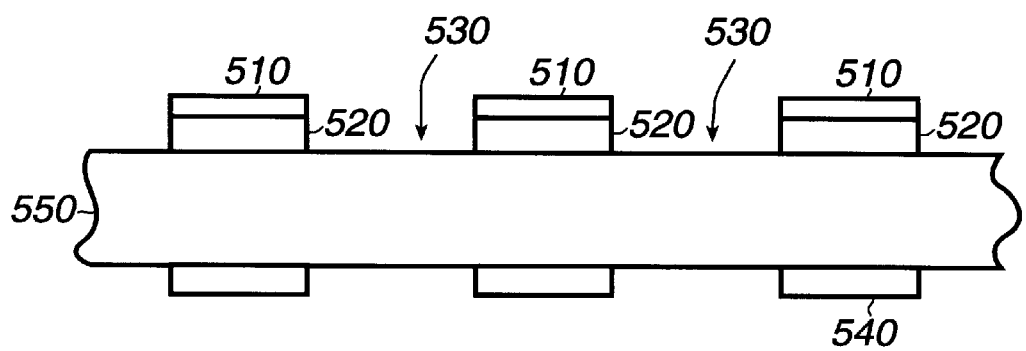
FIG. 8B is a cross-sectional schematic diagram of the cold cathode plate of FIG. 8A along line A—A.

In an alternative embodiment illustrated in FIGS. 8A and 8B, for the cathode plate of a cold cathode field emitting device for use in the present invention, a diamond film 510 overlying a metal conductor 520 is disposed in a mesh pattern on the upper face of glass cathode substrate 550 (as opposed to the "patches" pattern of FIG. 7). The mesh pattern includes openings 530 where a surface of the glass substrate is exposed. Optionally, patches of metal 540 may be disposed on the underface of glass cathode plate 520 to function as a mirror.

Figure 9A:
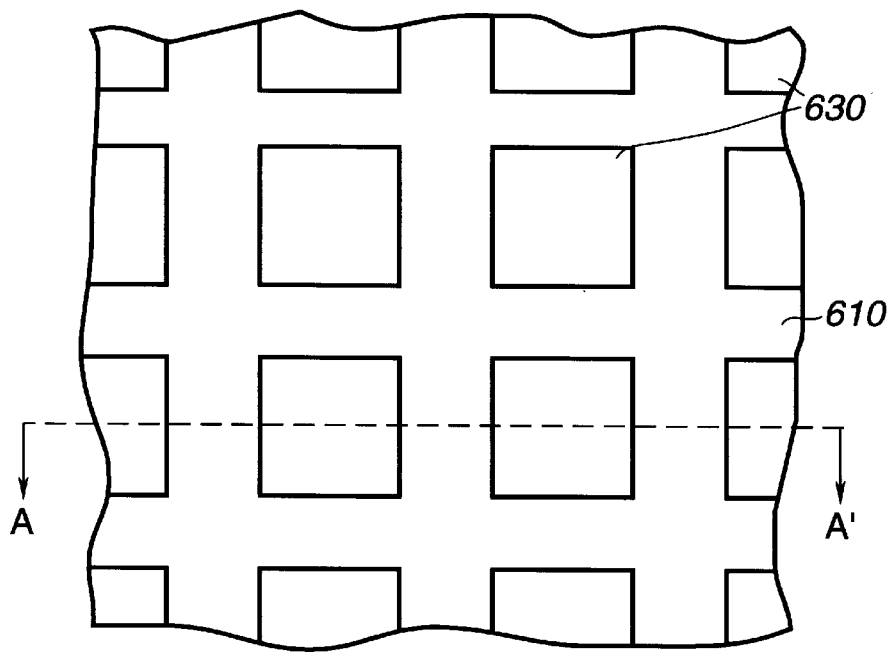
FIG. 9A is a schematic diagram of the surface of a field emitting device's anode plate (which also serves as the faceplate) employing a mesh patterned insulator and checkerboard patterned phosphors.
Figure 9B:
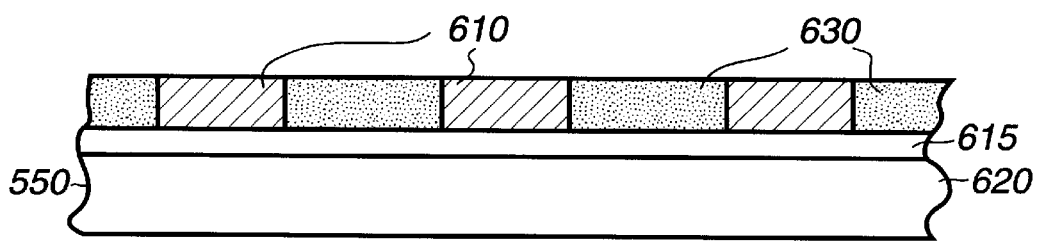
FIG. 9B is a cross-sectional schematic diagram of the anode plate of FIG. 9A along line A—A.

FIGS. 9A and 9B illustrate an embodiment of the combined anode plate and patterned phosphor faceplate for use with the cold cathode of FIGS. 8A and 8B. Mesh-patterned $SiO_2$ 610 is disposed on top of a layer of aluminum 615. The aluminum may be about 1–2 microns in thickness. The aluminum layer is on the face of anode glass substrate 620 which faces a cold cathode (such as the cold cathode of FIGS. 8A and 8B). Disposed in the checkerboard openings of mesh 610 are patches of phosphor material 630. Aluminum film 615 may act as an electrical contact and also as a mirrored surface to reflect light toward the sub-pixels.

Figure 10:
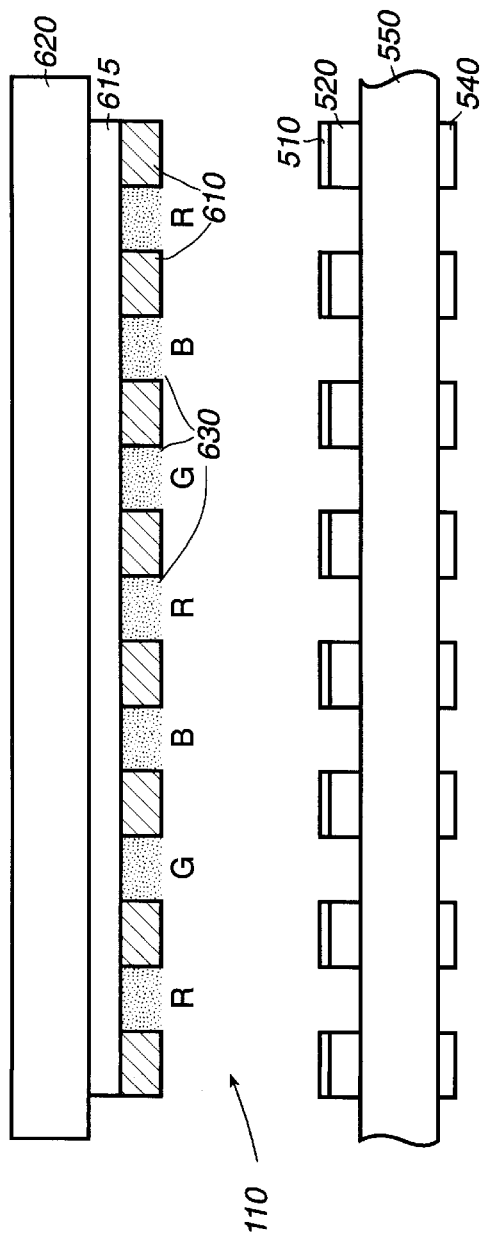
FIG. 10 is a schematic diagram of a portion of a cold cathode field emitting device-based LCD backlight assembly.

FIG. 10 illustrates an embodiment wherein the mesh-patterned diamond film cold cathode of FIGS. 8A and 8B is combined with the anode of FIGS. 9A and 9B to provide an LCD backlight assembly 110. Typical spacing between the glass cathode plate 550 and glass anode plate 620 (which also functions as the faceplate) would be on the order of 1–3 mm. Typical spacing between phosphor pixels 630 is on the order of 10–200 microns. Phosphor areas are aligned with the "holes" in the cold cathode.

As discussed earlier, the size of phosphor sub-pixels 630 can be the same or different from the liquid crystal cell size depending on the application. The various factors to be considered in determining the sizes are discussed below in reference to FIG. 11.

Figure 11:
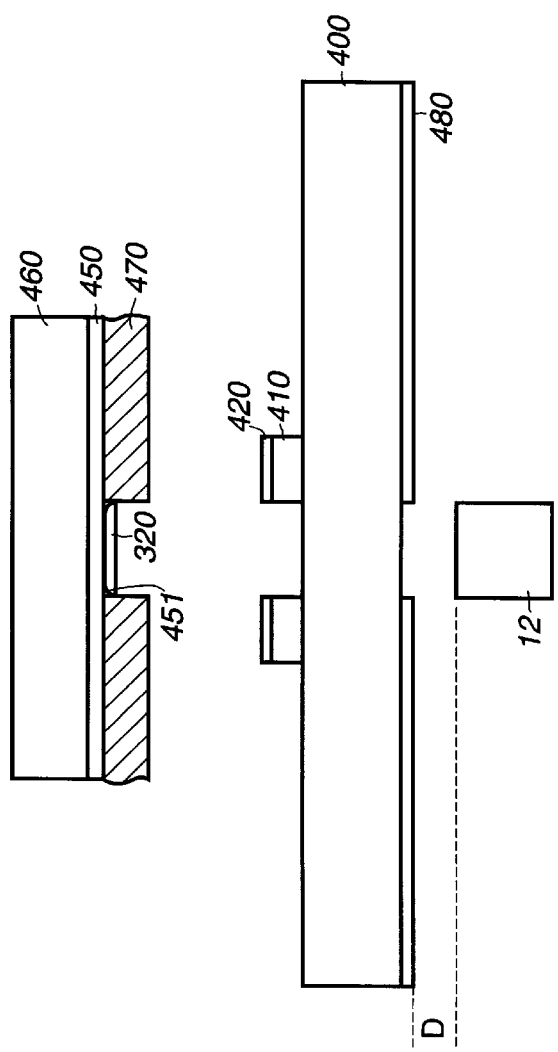
FIG. 11 is a schematic diagram depicting the relationship between two diamond field emitter patches, a single patterned phosphor pixel and the associated liquid crystal sub-pixel.

Referring to FIG. 11, colored light emitted from each phosphor pixel 320 scatters in all directions. Maximizing the percentage of colored light going into the liquid crystal sub-pixel 12 requires that the phosphor pixel 320 and gap D be as small as possible. However, phosphor lifetime and total light emission is increased as phosphor pixel size increases. Thus, the relative size of phosphor pixel 320, in comparison to liquid crystal sub-pixel 12, is determined by the desired light emitting efficiency and phosphor lifetime for a particular application.

Larger size of the metal conductor 410 and diamond film 420 reduces the required electric emission current density.

The aforementioned field-emitter based embodiments differ from conventional field emitting color-phosphor based display structures in that the present invention does not require any of the complex elements required to individually drive and address each phosphor pixel. In addition, it is envisioned that the present invention would always be operated in the permanently "on" condition. In such a condition, a sufficient electric field to cause the emission of electrons from the diamond films, and therefore the emission of light from the phosphors, is continually maintained whenever the associated liquid crystal matrix is in operation. Additionally, light passing to sub-pixel 12 may be focused by curving (451) aluminum layer 450 so that light emitted from phosphor 320 is reflected back in a focused manner. Furthermore, layer 480, which may be a black matrix material, may be coated on cathode 400.

Figure 12:
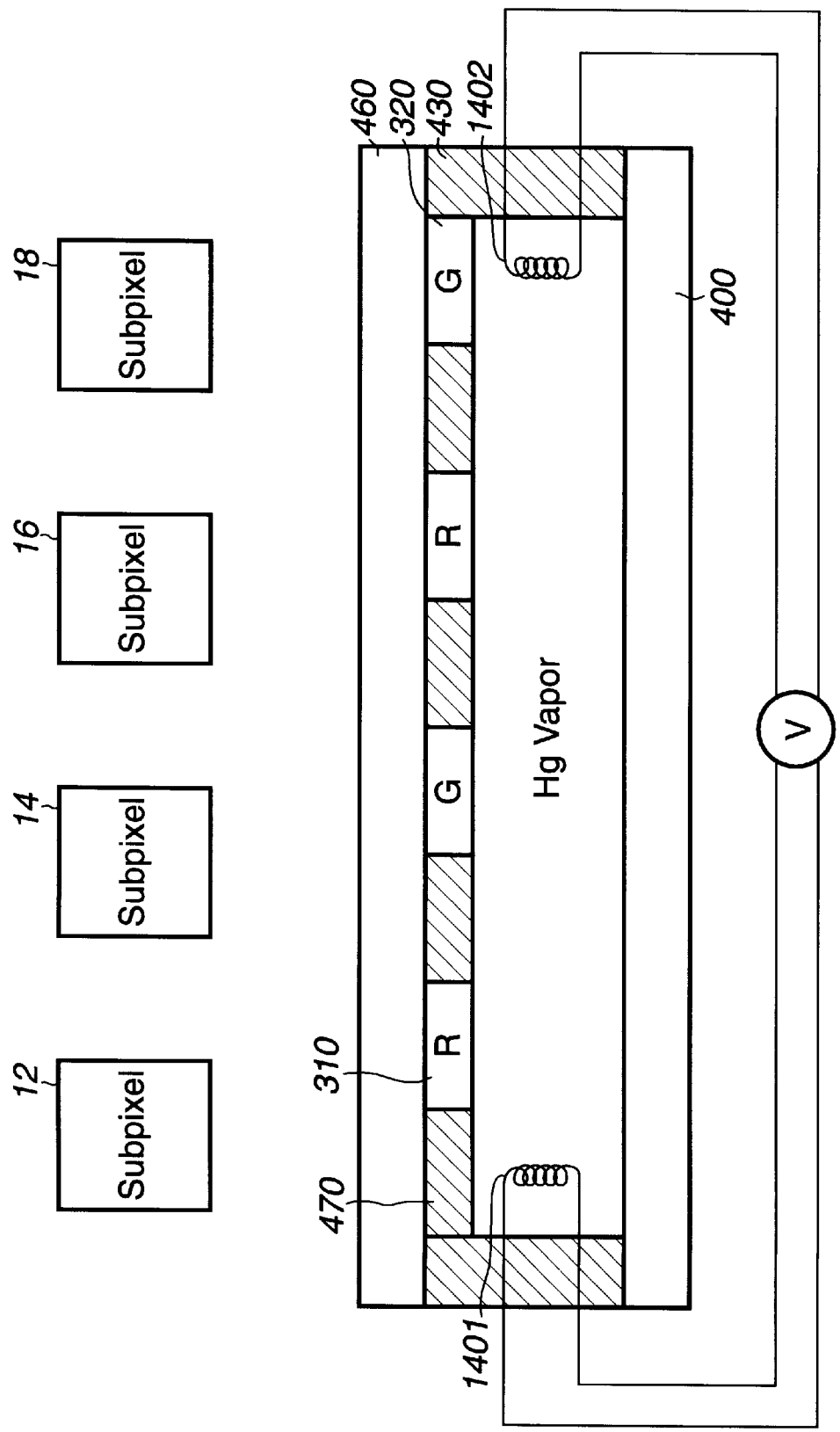
FIG. 12 illustrates an alternative embodiment of the present invention.

Referring next to FIG. 12, there is illustrated an alternative embodiment of the present invention, wherein a fluorescent lamp is utilized to bombard phosphors 310 and 320 with photons (UV light). The fluorescent lamp comprises elements 1401 and 1402, which energize a mercury (Hg) vapor into a plasma, which emits UV photons to excite the phosphors, which then emit light to the sub-pixels 12, 14, 16 and 18. Please refer to 23.4: Development and Production of a Flat Fluorescent Lamp for LCD Backlighting, W. Coleman, et al., SID 92 Digest, pp. 430–432, which is hereby incorporated by reference herein.

Herein, photons, electrons, and UV light may all be referred to as energetic particles.

Figure 13:
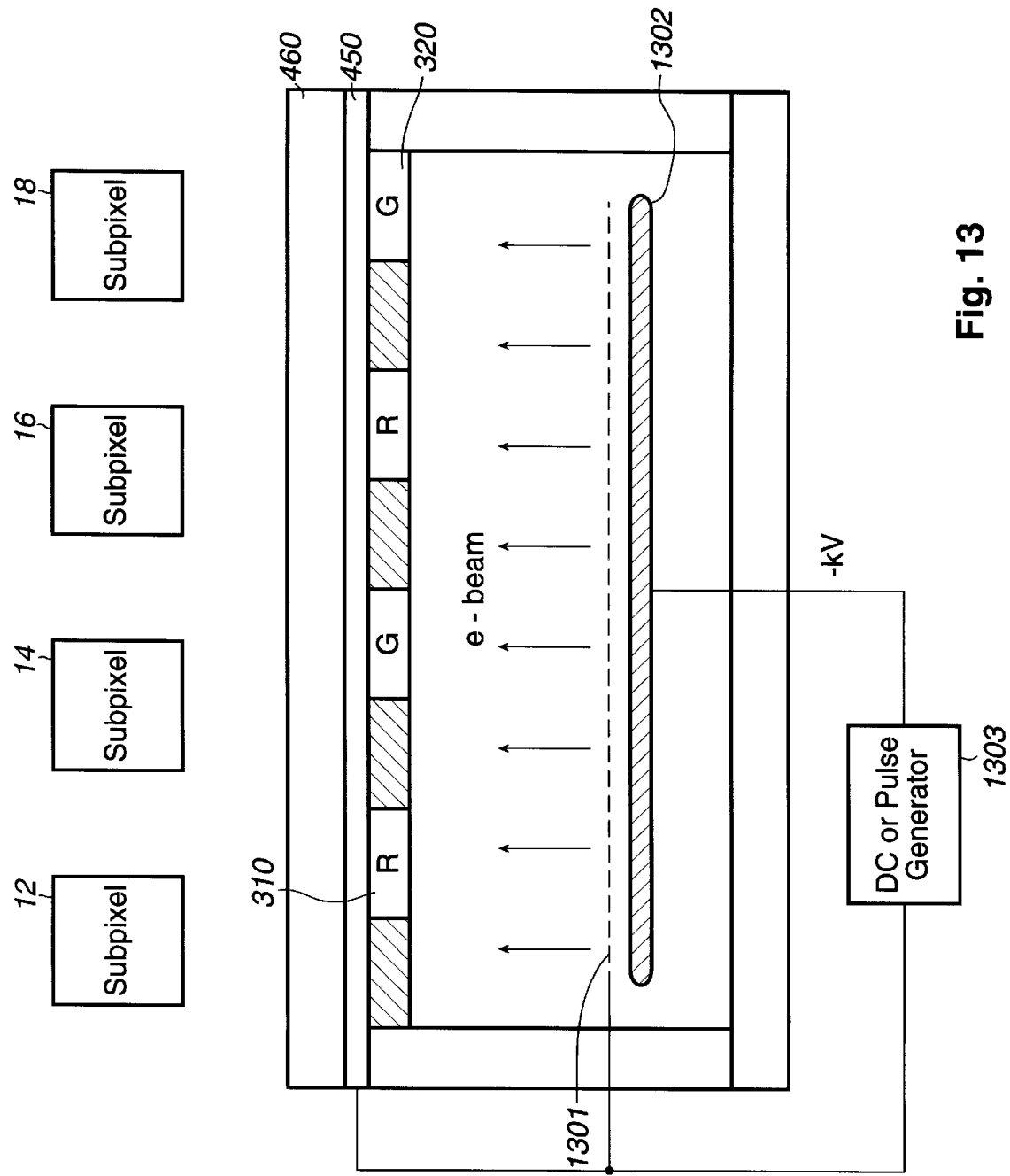
FIG. 13 illustrates another alternative embodiment of the present invention.

Referring next to FIG. 13, there is illustrated another alternative embodiment of the present invention whereby a high-intensity lamp employing an electron beam from a glow discharge is used to excite phosphors 310 and 320. DC or pulse generator 1303 activates cathode 1302 to emit electrons towards the phosphors. For a further discussion for the construction and operation of the apparatus illustrated in FIG. 13, please refer to U.S. Pat. application Ser. No. 08/706,077 entitled High Intensity Lamp, assigned to a common assignee, which is hereby incorporated by reference herein.

The backlight assembly 110 can be used in conjunction with both passive matrix and active matrix LCD arrays. In both cases the benefit of eliminating the need for expensive color filters and increasing the efficiency of light transmission is obtained.

Referring next to FIG. 16, there is illustrated backlight 1600, which is an electroluminescent backlight incorporating a thin film phosphor 1603, which may be comprised of ZnS:Mn. Thin film phosphor 1603 is sandwiched between ITO 1602, which has been deposited on glass substrate 1601, and $SiO_2$ layer 1604 and metal (Al or Mg/Al) layer 1605.

Light is emitted from thin film phosphor 1603 as a result of a bombardment of electrons from metal layer 1605 when a voltage potential is applied between ITO layer 1602 and metal layer 1605. Backlight assembly 1600 may be substituted for backlight assembly 110 shown in FIG. 2, or in any of the other embodiments described herein where a backlight is required to produce light for an LCD display.

Referring next to FIG. 17, there is illustrated backlight assembly 1700, which utilizes a vacuum fluorescent display (VFD) approach. The top portion of backlight assembly 1700 is similar to those described previously where an ITO layer 1705 has been deposited on glass substrate 1704, and then red 1707, green 1708, and blue 1709 phosphors are deposited between black matrix material 1706 on ITO layer 1705.

Electrons (e) are emitted from a thermionic emitter 1702, which may utilize a tungsten filament that is activated with an AC or DC power supply 1703. Thermionic emitter 1702 may be constructed on glass substrate 1701.

Figure 18:
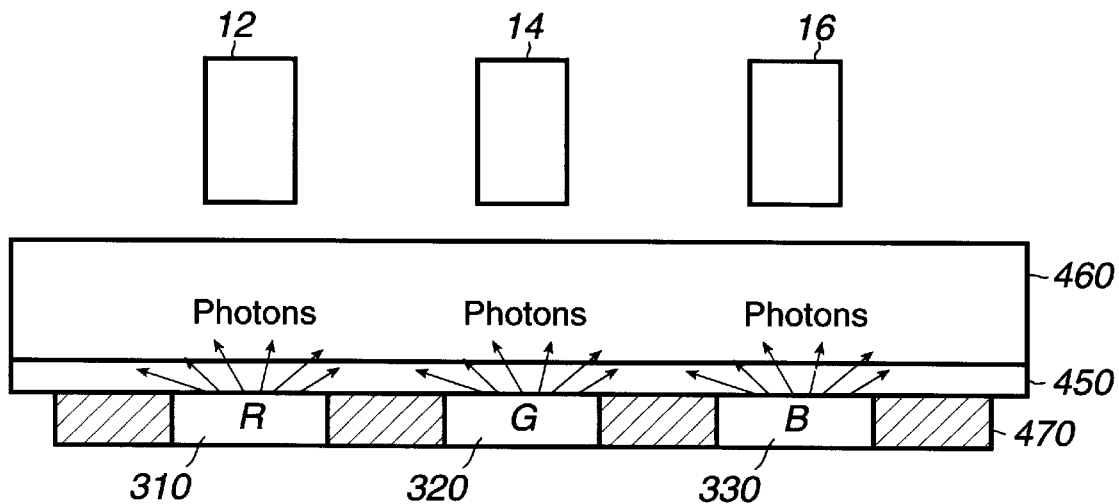
FIG. 18 illustrates diff-union of light from colored phosphors in various directions through the glass substrate of a backlight.

Referring next to FIG. 18, there is illustrated a portion of an LCD display comprised of individual liquid crystal sub-pixels 12, 14, and 16, which receive red, green, and blue light, respectively, from red phosphor 310, green phosphor 320, and blue phosphor 330, respectively. FIG. 18 illustrates how light from each of phosphors 310, 320, and 330 diffuses in many directions through ITO layer 450 and glass substrate 460. As a result, very little of the light from phosphors 310, 320 and 330 makes it to sub-pixels 12, 14, and 16 (typically optical coupling of light emitted from the phosphors to each of the sub-pixels is approximately 10% of the total light produced).

Additionally, there is the problem of cross-talk of colored light to adjoining sub-pixels. In other words, for example, a portion of green photons produced by green phosphor 320 are emanated to sub-pixels 12 and 16.

Figure 19:
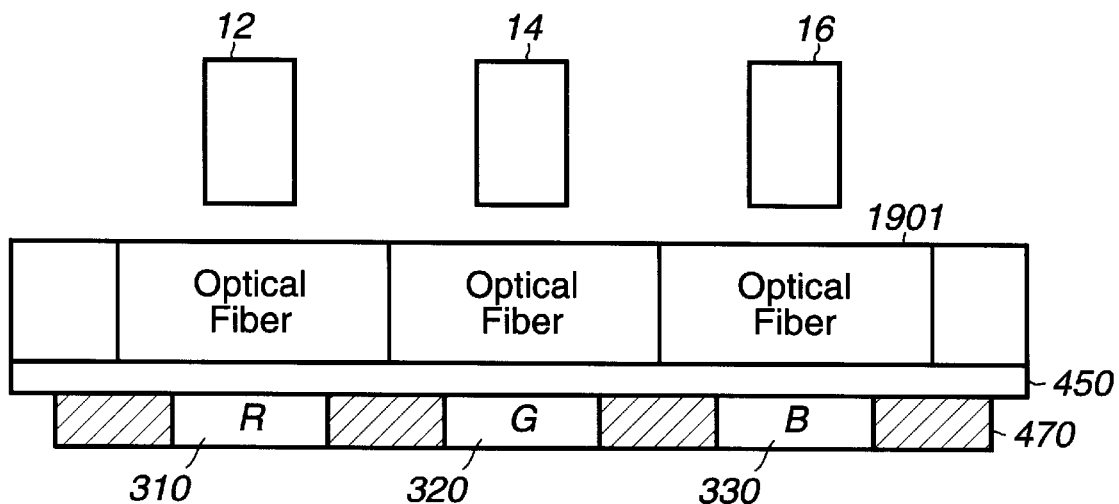
FIG. 19 illustrates use of optical fibers as a collimator.

Referring next to FIG. 19, there is illustrated one solution to the foregoing problem (see FIG. 18) whereby the light emitted from each of phosphors 310, 320, and 330 is collimated by substrate 1901, which is comprised of optical fibers. One optical fiber may be associated with each of phosphors 310, 320, and 330 so that the light emitted from each of these phosphors 310, 320, 330 is guided upwards to sub-pixels 12, 14, and 16, respectively.

Optical fiber substrate 1901 may be produced by cutting an optical fiber into one foot links, stacking side-by-side these one foot links of optical fiber, and then drawing them together under heat so that the sides of the optical fibers fuse together. The fused optical fibers are then sliced and polished to produce substrate 1901.

Figure 22:
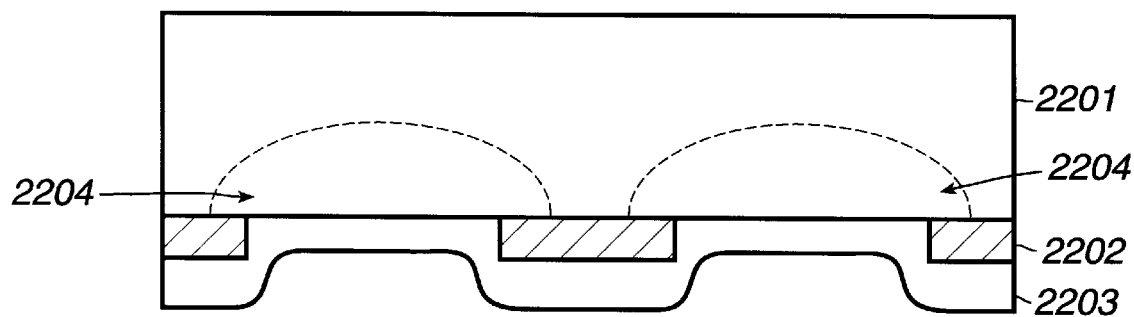
FIG. 22 illustrates diffusion of a dopant into a glass substrate.

Referring next to FIG. 22, there is illustrated an alternative embodiment for providing a collimator for focusing light produced by phosphors. Collimator 2201 is comprised of a glass substrate that has been doped 2204 with a substance. The doping of collimator 2201 results in a refractive index of the doped region so that essentially a lens is produced to focus light entering collimator 2201.

The doped portion 2204 may be produced by a photolithography method whereby a mask 2202 is placed over substrate 2201 and then a dopant 2203 is spun onto the surface. The dopant material then diffuses into substrate 2201.

The collimators illustrated in FIGS. 19 and 22 may be produced in a manner as described within the Selfoc Product Guide produced by NSG America, Inc. © 1996, which is hereby incorporated by reference herein.

Figure 23:
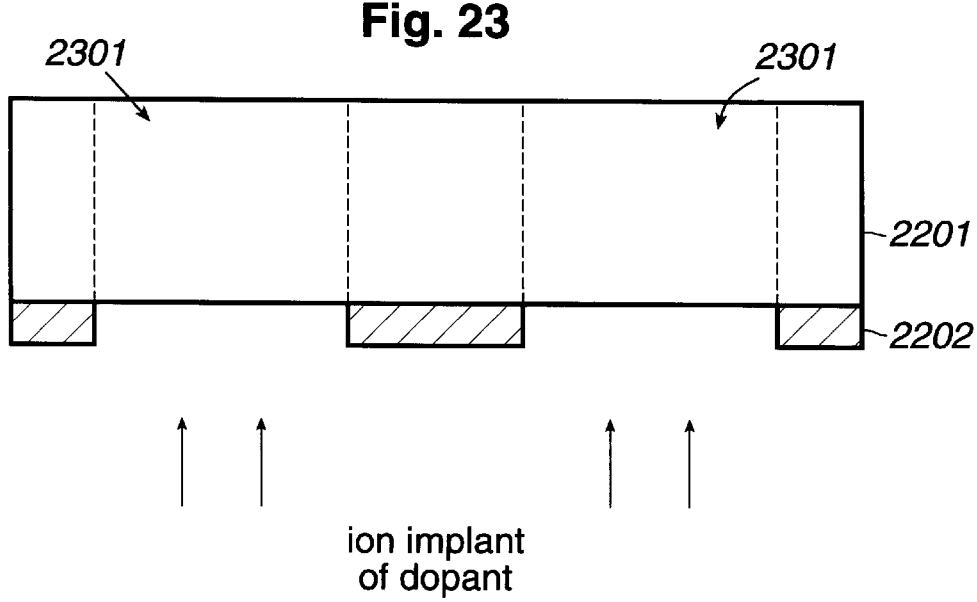
FIG. 23 illustrates implantation of a dopant into a glass substrate using an ion implant process.

Referring next to FIG. 23, there is illustrated another alternative embodiment of a collimator 2201, which is produced by using an ion implant of a dopant into a glass substrate through a mask 2202 to produce regions 2301 of the glass substrate, which have a different refractive index for focusing light entering into the substrate.

Figure 24:
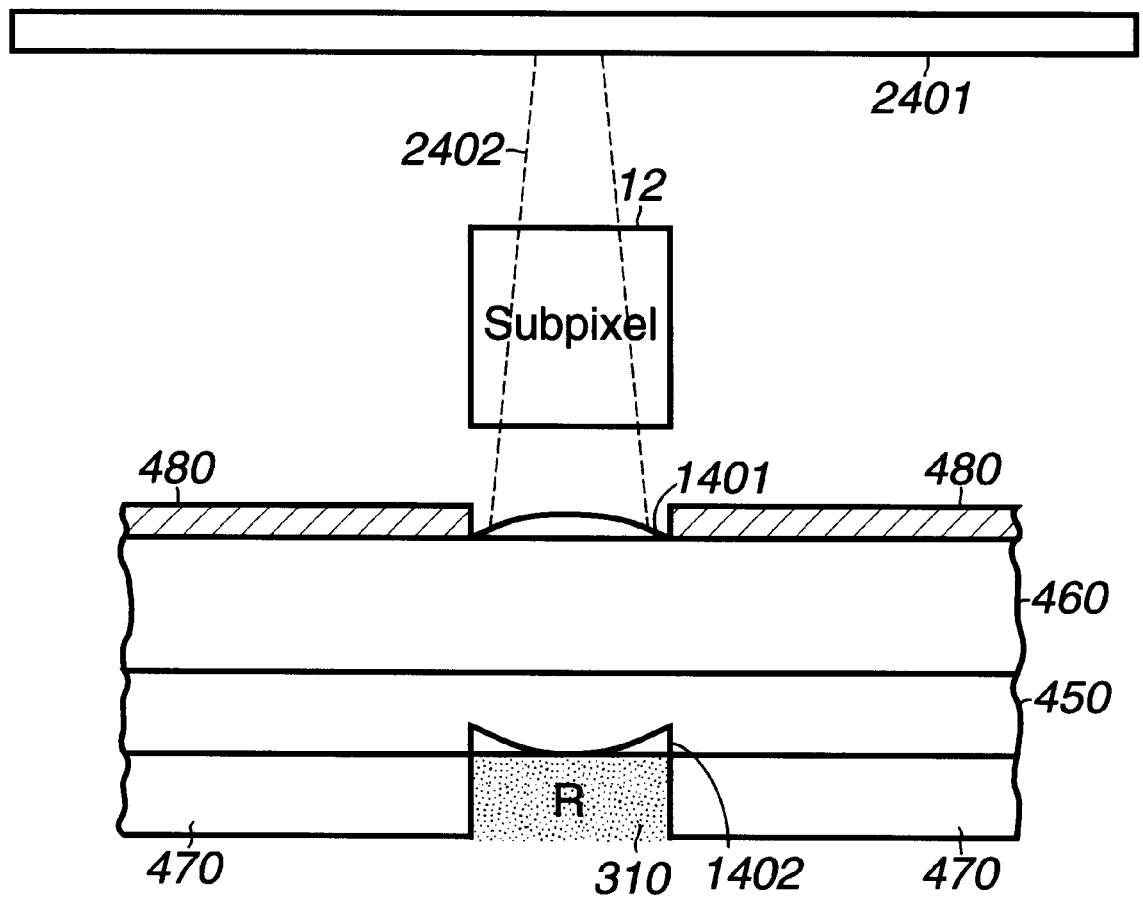
FIG. 24 illustrates the narrowing of the light beam from the backlight as a result of the use of focusing lenses, and the compensation thereof with a diffuser.

Referring next to FIG. 24, there is illustrated a solution for solving one problem associated with collimators. Collimators operate to focus light passing therethrough. This is shown by light beam 2402 being focused by lens' 1401 and 1402. It may be desirable to diffuse the light being passed to the user with a plastic diffuser 2401 to assist in providing a wider field of vision for the user when viewing the display. Alternatively, roughened glass may be used instead of a plastic diffuser.

Figure 20:
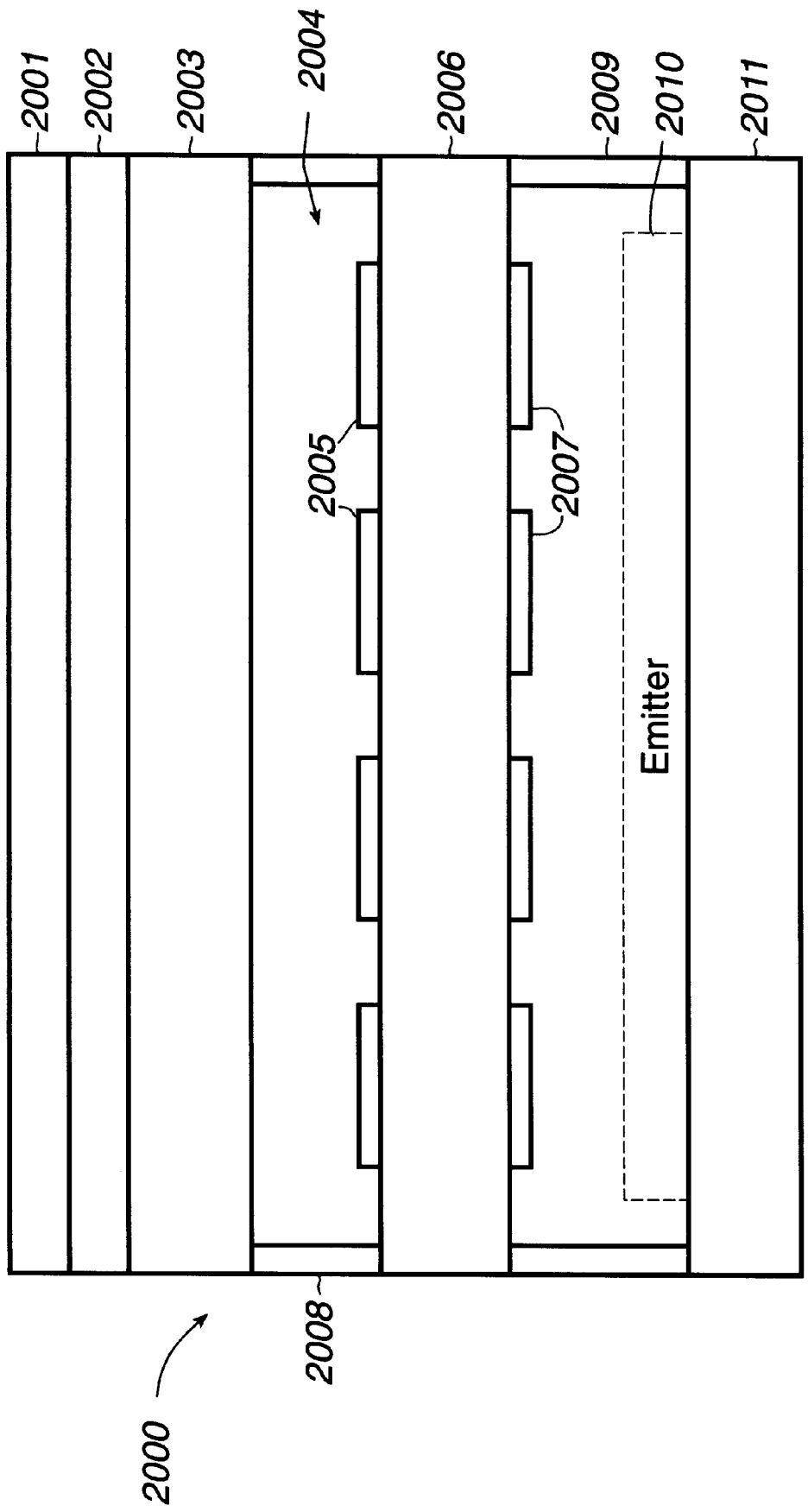
FIG. 20 illustrates an LCD manufactured with only three glass substrates.

Referring next to FIG. 20, there is illustrated portion 2000 of an LCD panel whereby LCD panel 2000 utilizes less than four glass substrates. As noted above in FIGS. 2, 7 and the other illustrated embodiments, typically four glass substrates are required to manufacture and implement an LCD panel. With reference to FIG. 2, a typical backlight assembly 110 requires two glass substrates while the subpixels 28 each require two substrates 38 and 32 to implement. A simpler LCD panel design may be desired using less than four glass substrates.

LCD panel 2000 is produced by depositing polarizer 2002 and diffuser 2001 on glass face plate 2003. Only one polarizer 2002 is required under certain well-known technologies.

Glass substrate 2003 is then coupled to collimator 2006 along with LCD cell 2004 therebetween. LCD cell 2004 includes rows of ITO 2005. LCD cell 2004 is sealed between substrate 2003 and collimator 2006 with epoxy seals 2008.

Deposited on collimator 2006 are phosphors 2007, which emit light in response to the receipt of electrons emitted from emitter 2010, which may be comprised of any of the electron emitters described herein. Emitter 2010 is manufactured on glass substrate 2011, which is coupled with collimator 2006 using frit seals 2009.

As can be readily seen, there are only three glass substrates 2003, 2006, 2011, used to produce LCD panel 2000.

Figure 21:
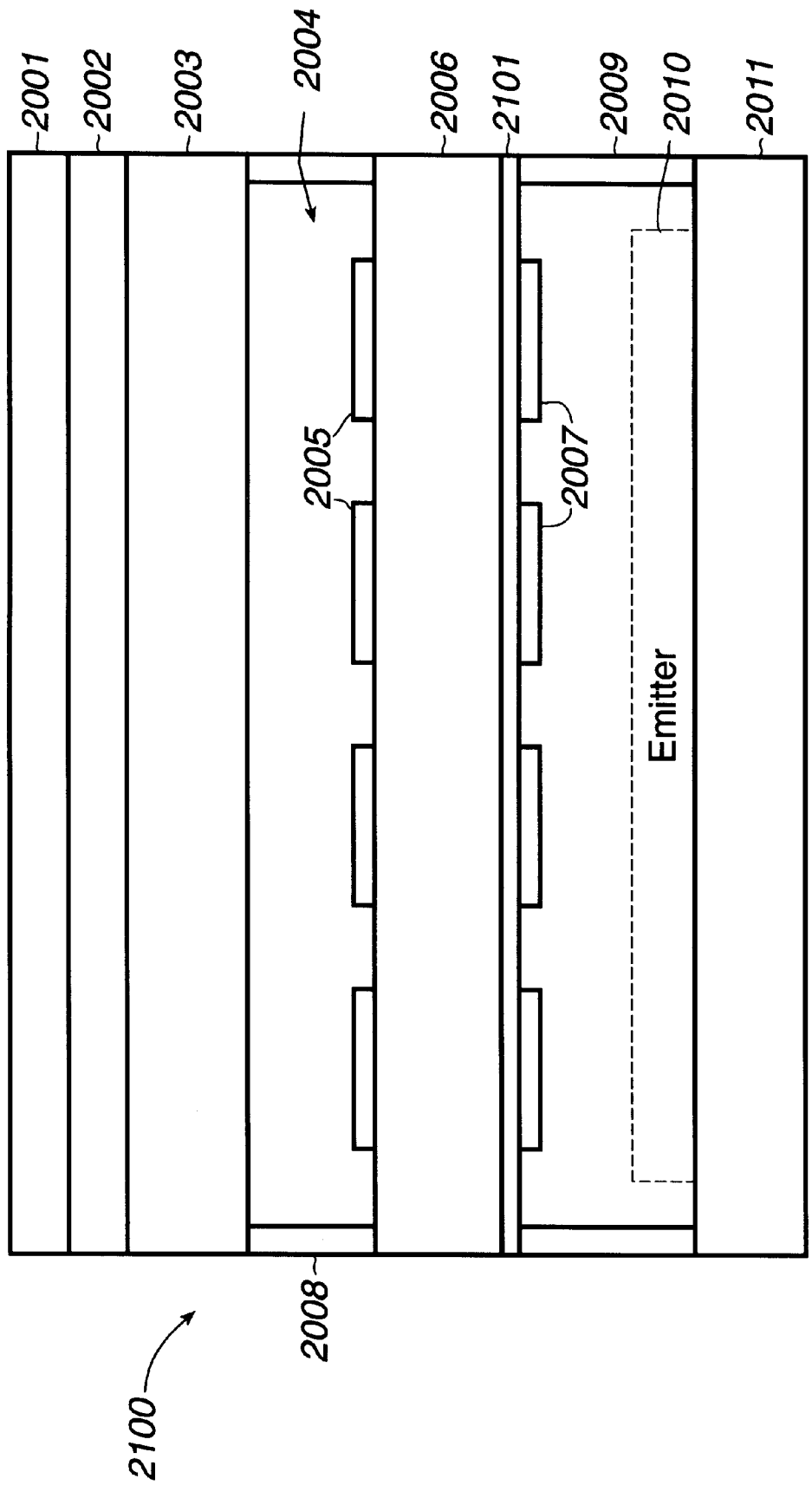
FIG. 21 illustrates an alternative embodiment of an LCD manufactured using only three glass substrates.

FIG. 21 illustrates an alternative embodiment of LCD panel 2000 where thin film polarizer 2101 has been added between collimator 2006 and phosphors 2007. LCD panel 2100 thus utilizes an LCD configuration where two polarizers 2002 and 2101 are utilized.

Figure 25:
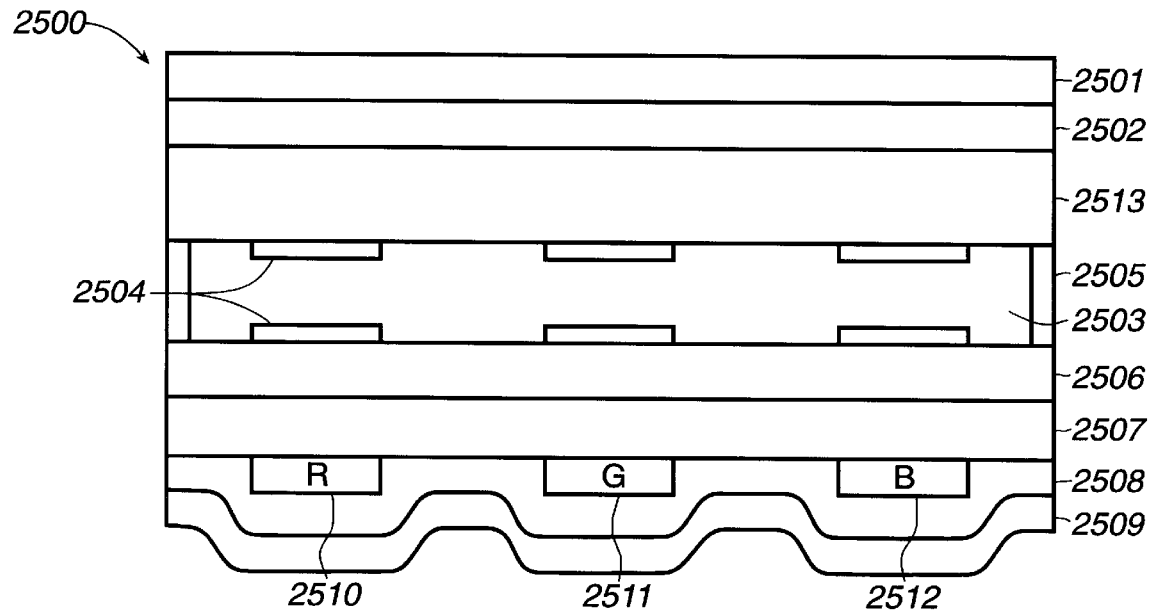
FIG. 25 illustrates an alternative embodiment of an LCD manufactured from only two glass substrates.

Referring next to FIG. 25, there is illustrated another alternative embodiment of the present invention. LCD panel 2500 requires only two glass substrates 2513 and 2506 to produce. Diffuser 2501 and polarizer 2502 are deposited on glass face plate 2513. Sandwiched between face plate 2513 and collimator 2506 is liquid crystal cell 2503 using ITO lines 2504. An epoxy seal 2505 is used to seal liquid crystal cell 2503 between substrates 2513 and 2506.

ITO 2507 is then deposited on collimator 2506. Light is produced from red phosphor 2510, green phosphor 2511, and blue phosphor 2512 using the thin film electroluminescent technology described above with respect to FIG. 16. A voltage potential (not shown) is produced between ITO layer 2507 and metal layer 2509, which has been deposited on silicon dioxide layer 2508. The various layers may be deposited using sputtering or evaporization techniques.

Figure 26:
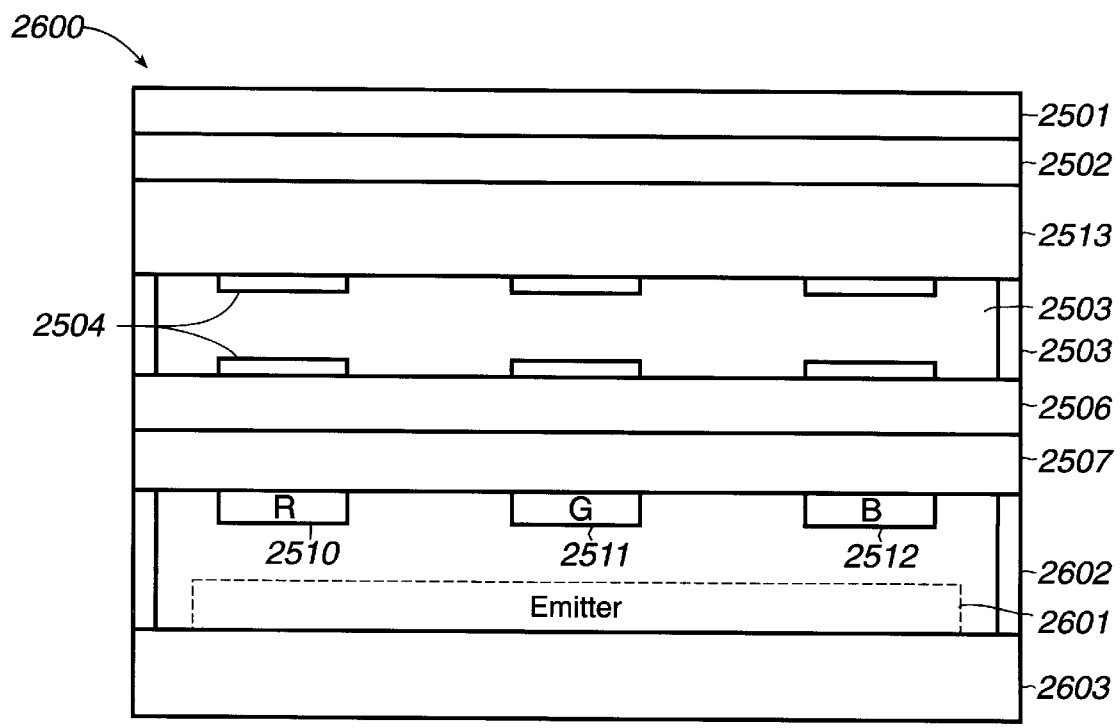
FIG. 26 illustrates another embodiment of an LCD manufactured from only two glass substrates.

Referring next to FIG. 26, there is illustrated LCD panel 2600, which also only requires the use of three glass substrates 2513, 2506, and 2603. Items 2501–2507 and 2510–2513 are similar or the same as described above with respect to FIG. 25. Phosphors 2510–2512 produce light as a result of bombardment of electrons from an electron emitter 2601, which is manufactured on glass substrate 2603 and sealed to LCD panel 2600 with frit seals 2602. Any of the disclosed electron emitters described herein may be utilized as electron emitter 2601.

Referring next to FIG. 27, there is illustrated an alternative embodiment of the present invention comprising LCD panel 2700, which requires only two glass substrates 2513 and 2506 to implement. Again, items 2501–2507 and 2510–2513 are the same as or similar to those described above with respect to FIG. 25. Light is emitted from phosphors 2510–2512 as a result of bombardment by electrons from ultraviolet ("UV") lamp 2701. Please note that there is no sealing required between UV lamp 2701 and the remainder of LCD panel 2700.

Referring next to FIG. 28, there is shown another alternative embodiment of an LCD panel 2800 requiring only two glass substrates 2513 and 2805. LCD panel 2800 also utilizes the thin film electroluminescent technology described above. Light is emitted from phosphors 2510–2512 as a result of a bombardment of electrons from metal layer 2804 as a result of an application of a voltage potential (not shown) between ITO 2802 and metal layer 2804.

Figure 29:
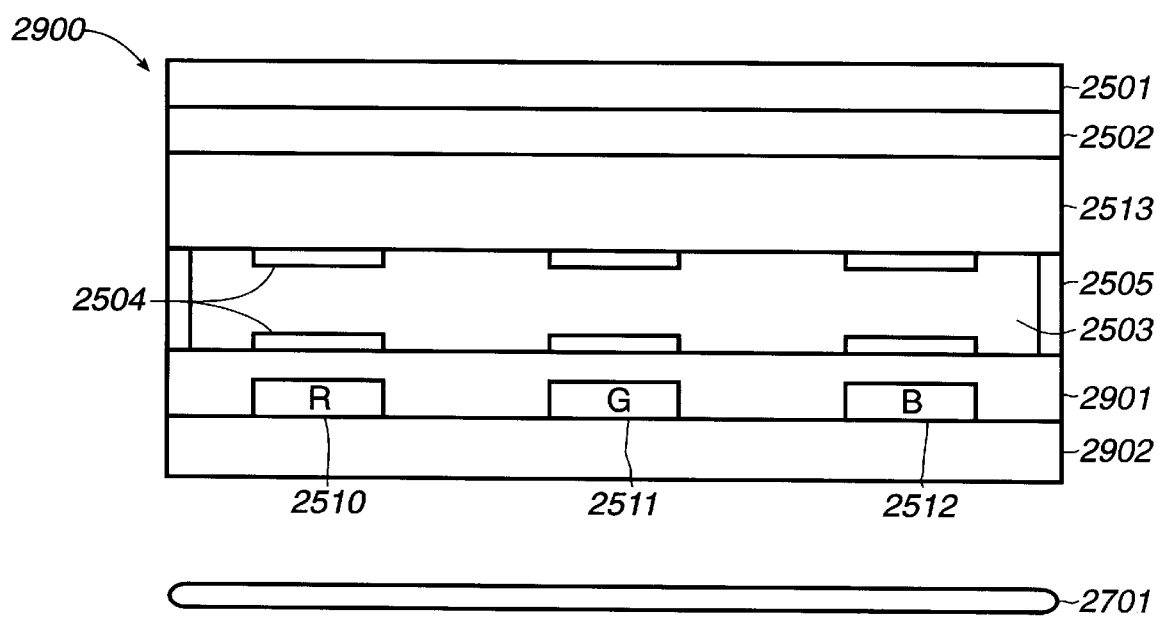
FIG. 29 illustrates another embodiment of an LCD using only two glass substrates along with an ultraviolet lamp.

Referring next to FIG. 29, there is illustrated yet another alternative embodiment of the present invention comprising LCD panel 2900. Items 2501–2505 and 2510–2513 are the same as or similar to those described above with respect to FIG. 25.

However, phosphors 2510–2512 have been deposited upon quartz substrate 2902. Quartz is used since it is transparent to UV light. Layer 2901 comprised of boron or phosphorus doped silicon dioxide (BPSG) is deposited between liquid crystal cell 2503 and glass substrate 2902. Bombardment of phosphors 2510–2512 is produced by UV lamp 2701.

Figure 15:
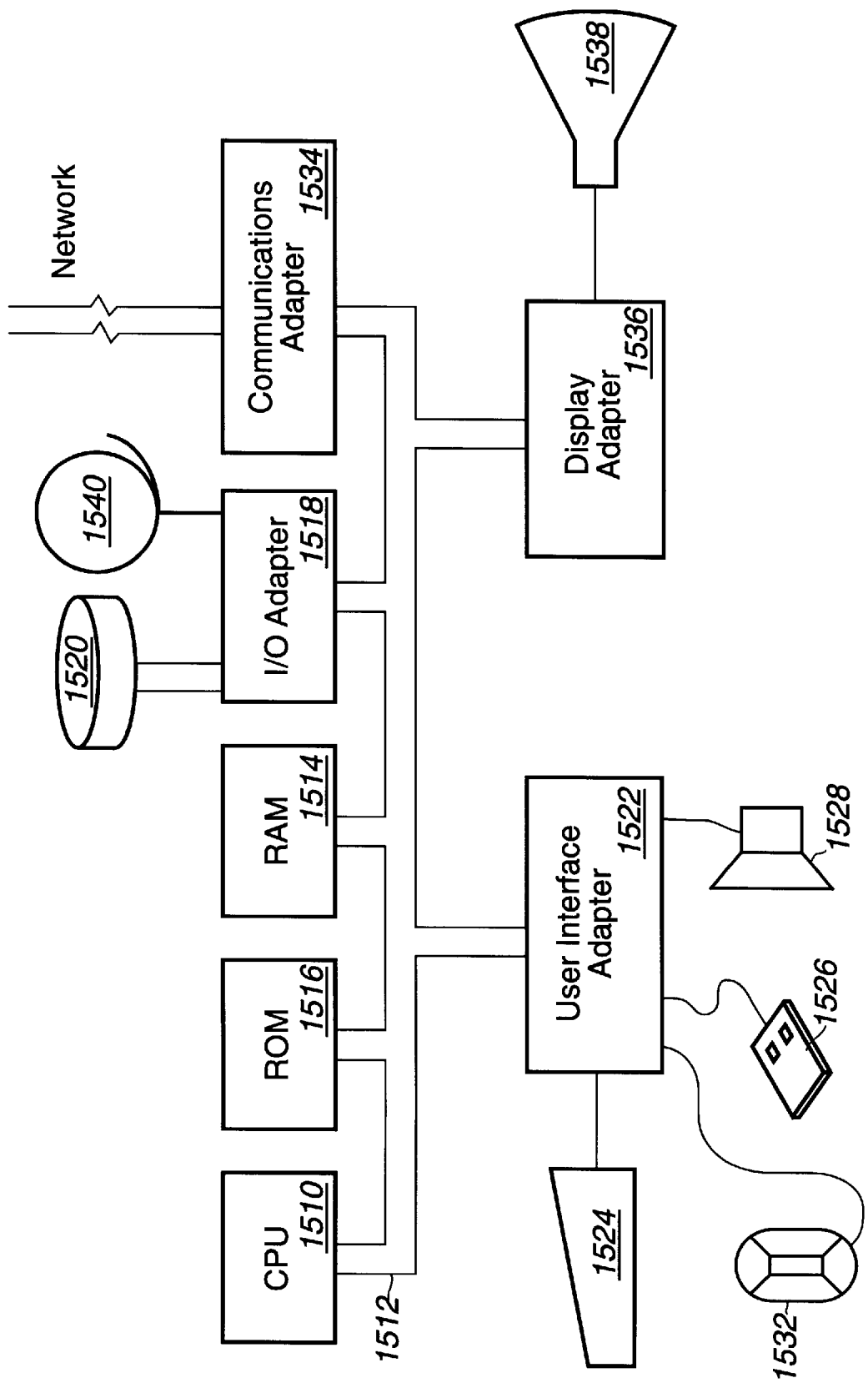
FIG. 15 illustrates a data processing system in accordance with the present invention.

A representative hardware environment for practicing the present invention is depicted in FIG. 15, which illustrates a typical hardware configuration of a workstation in accordance with the subject invention having central processing unit (CPU) 1510, such as a conventional microprocessor, and a number of other units interconnected via system bus 1512. The workstation shown in FIG. 15 includes random access memory (RAM) 1514, read only memory (ROM) 1516, and input/output (I/O) adapter 1518 for connecting peripheral devices such as disk units 1520 and tape drives 1540 to bus 1512, user interface adapter 1522 for connecting keyboard 1524, mouse 1526, speaker 1528, microphone 1532, and/or other user interface devices such as a touch screen device (not shown) to bus 1512, communication adapter 1534 for connecting the workstation to a data processing network, and display adapter 1536 for connecting bus 1512 to display device 1538. CPU 1510 may include other circuitry not shown herein, which will include circuitry commonly found within a microprocessor, e.g., execution unit, bus interface unit, arithmetic logic unit, etc. CPU 1510 may also reside on a single integrated circuit.

Display 1538 may embody any one of the liquid crystal display embodiments described herein.

Although the present invention and its advantages have been described in detail, it should be understood that various changes, substitutions and alterations can be made herein without departing from the spirit and scope of the invention as defined by the appended claims.

What is claimed is:

1. An LCD display comprising:

a first transparent substrate;

a second transparent substrate;

a liquid crystal cell disposed between the first and second transparent substrates;

a first transparent conductor layer disposed on the second transparent substrate;

colored phosphor pixels disposed on the first transparent conductor layer;

an insulator layer disposed over the colored phosphor pixels; and a second conductor layer disposed on the insulator layer.

2. The LCD display as recited in claim 1, further comprising:

a polarizer layer disposed on the first transparent substrate; and a diffuser layer disposed on the polarizer layer.

* * * * *